United States Patent
Makino et al.

(10) Patent No.: US 7,489,832 B2
(45) Date of Patent: Feb. 10, 2009

(54) IMAGING APPARATUS, IMAGE PROCESSING METHOD FOR IMAGING APPARATUS AND RECORDING MEDIUM

(75) Inventors: Tetsuji Makino, Ome (JP); Masao Sambongi, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 548 days.

(21) Appl. No.: 11/236,174

(22) Filed: Sep. 27, 2005

(65) Prior Publication Data
US 2006/0067588 A1 Mar. 30, 2006

(30) Foreign Application Priority Data
Sep. 28, 2004 (JP) ............................ 2004-282588

(51) Int. Cl.
*G06K 9/36* (2006.01)
(52) U.S. Cl. .................................... 382/287
(58) Field of Classification Search .................. 382/287
See application file for complete search history.

(56) References Cited

U.S. PATENT DOCUMENTS

| | | | | |
|---|---|---|---|---|
| 4,641,199 | A * | 2/1987 | Miyagi | 358/483 |
| 6,873,732 | B2 | 3/2005 | Dance | |
| 2001/0022858 | A1* | 9/2001 | Komiya et al. | 382/274 |
| 2003/0026502 | A1* | 2/2003 | Fujiwara | 382/294 |
| 2005/0047775 | A1* | 3/2005 | Sakurai et al. | 396/430 |
| 2005/0078192 | A1* | 4/2005 | Sakurai et al. | 348/207.99 |
| 2005/0078879 | A1* | 4/2005 | Sakurai et al. | 382/275 |
| 2005/0225808 | A1* | 10/2005 | Braudaway et al. | 358/3.26 |
| 2006/0043264 | A1* | 3/2006 | Sakurai | 250/208.1 |

FOREIGN PATENT DOCUMENTS

| | | |
|---|---|---|
| JP | 2002-094836 A | 3/2002 |
| JP | 2002-354331 A | 12/2002 |
| JP | 2003-091721 A | 3/2003 |
| JP | 2003-204452 A | 7/2003 |

OTHER PUBLICATIONS

Japanese Office Action (and English translation thereof) dated Feb. 19, 2008, issued in a counterpart Japanese Application.
Japanese Office Action (and English translation thereof) dated May 20, 2008, issued in a counterpart Japanese Application.

* cited by examiner

*Primary Examiner*—Jingge Wu
*Assistant Examiner*—Max Shikhman
(74) *Attorney, Agent, or Firm*—Frishauf, Holtz, Goodman & Chick, P.C.

(57) ABSTRACT

Dots (14) are marked on the stage surface of a stage (13) beforehand, and when an original (5) is placed on that stage, a document camera (1) acquires stage specification information such as the number of pixels of an image of the dot (14) and that of a check area (82) of the image thereof, based on the resolution of a shot image obtained by shooting. Based on the acquired stage specification information, the document camera (1) identifies an area of an image of the stage (13), acquires a binarized image which represents the area of the image of the stage (13) in white, so that a boundary between an area of an image of the original (5) and the area of the image of the stage (13) becomes clarified. Based on the binarized image, the document camera (1) determines the outline of the image of the original (5), and acquires the image thereof.

7 Claims, 27 Drawing Sheets

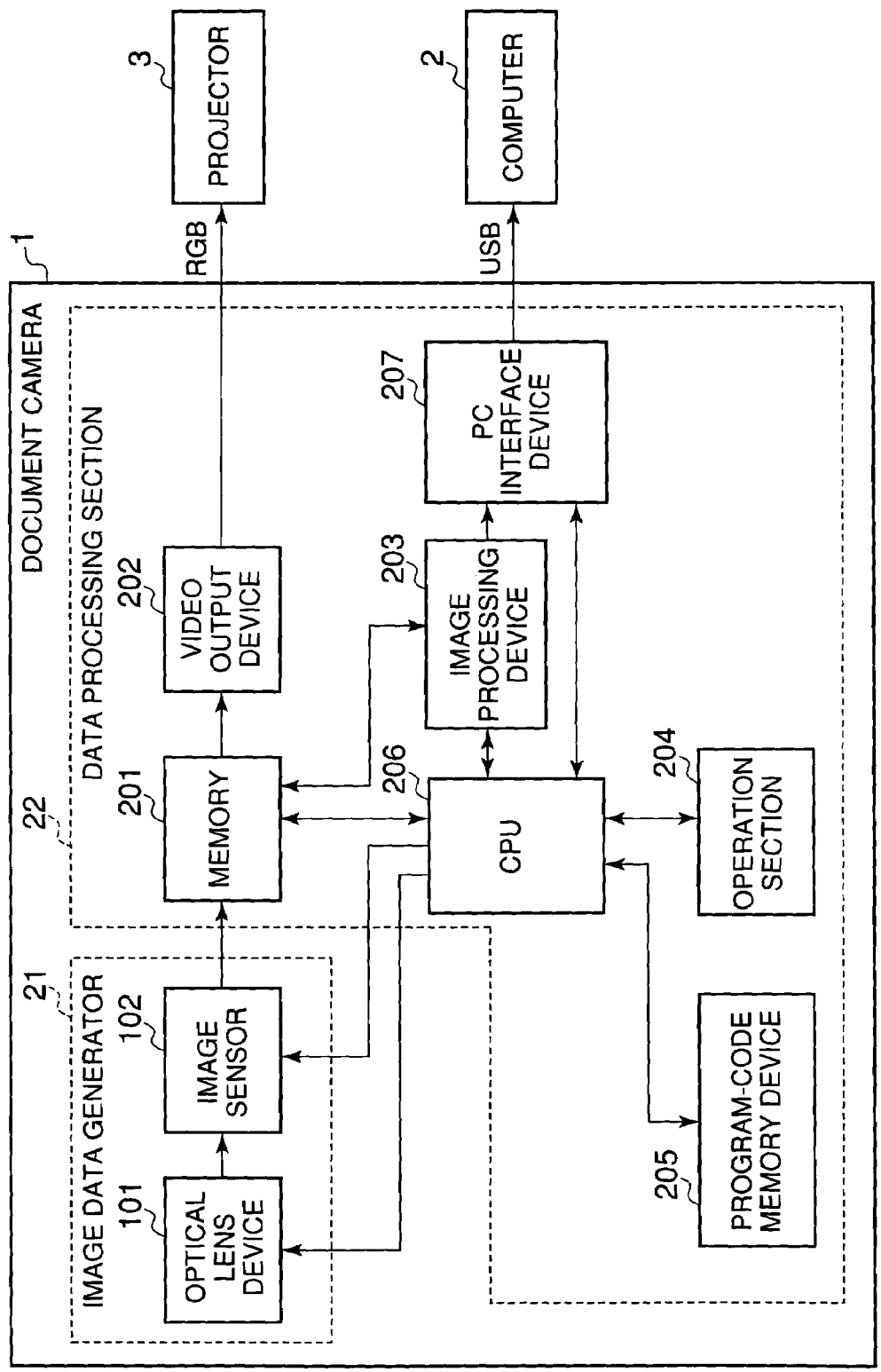

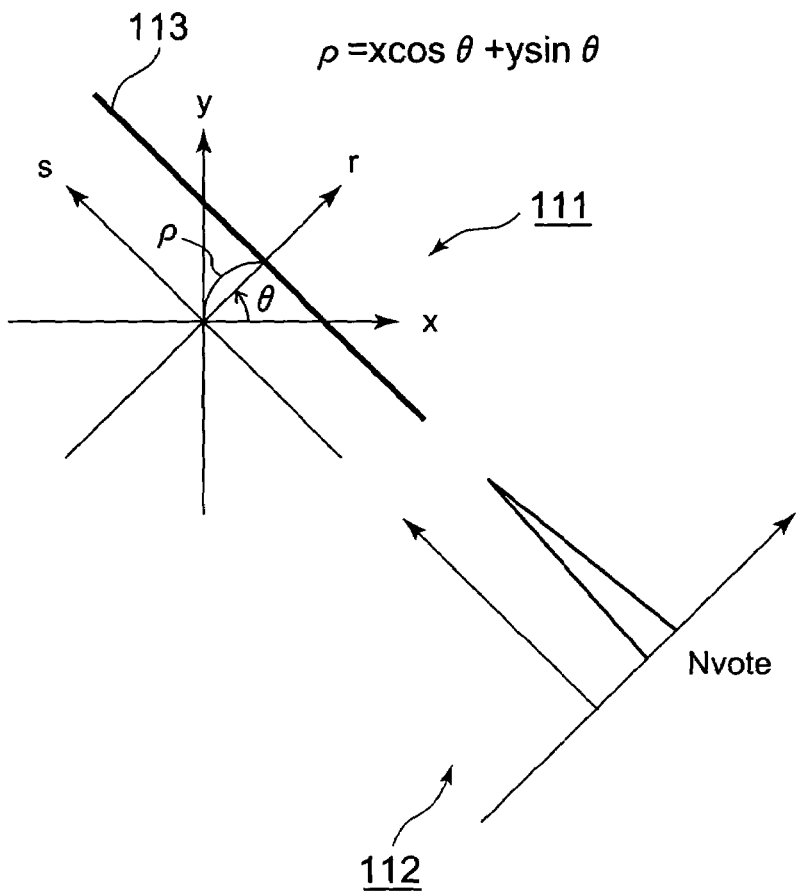
FIG. 11A
FIG. 11B
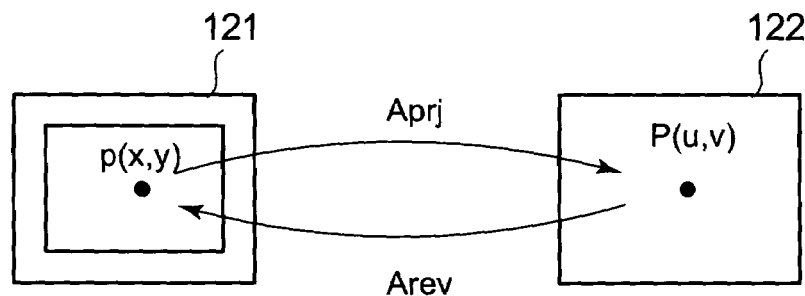
FIG. 12

FIG. 21A
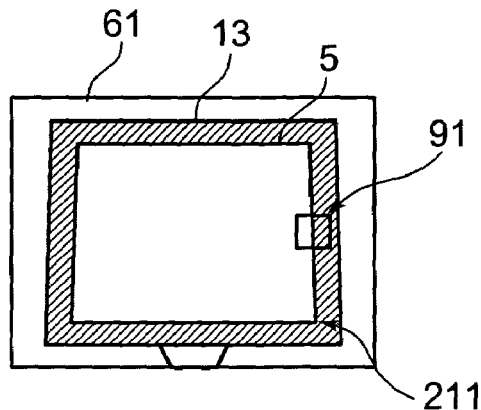
FIG. 21B
| 0 | 0 | 1 | 0 |
|---|---|---|---|
| 0 | 1 | 0 | -1 |
| 1 | 0 | -1 | 0 |
| 0 | -1 | 0 | 0 |
214
FIG. 21C
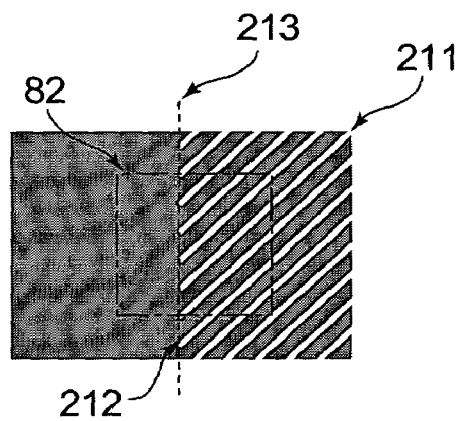
FIG. 21D
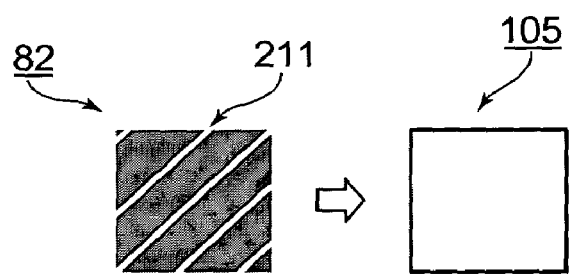
FIG. 21E
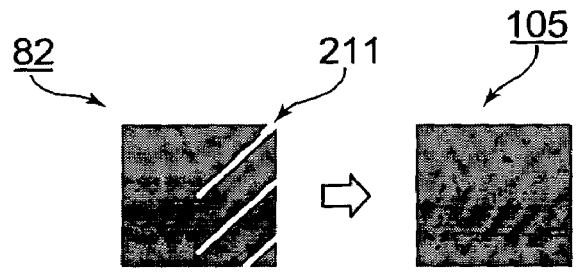

FIG. 22A
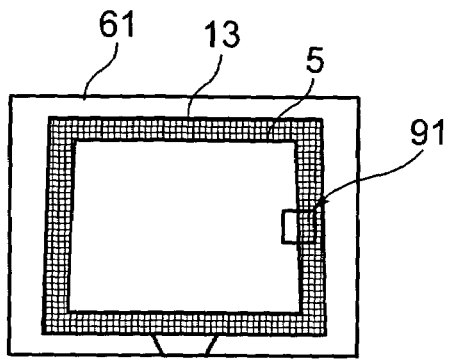
FIG. 22B
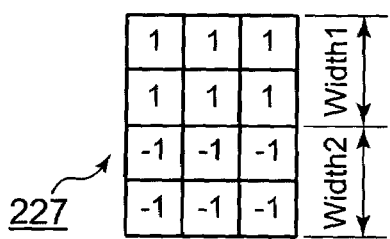
FIG. 22C
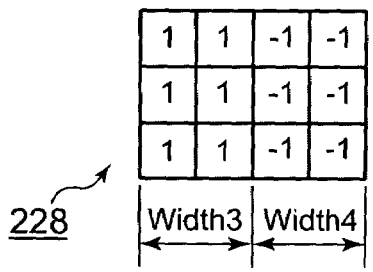
FIG. 22D
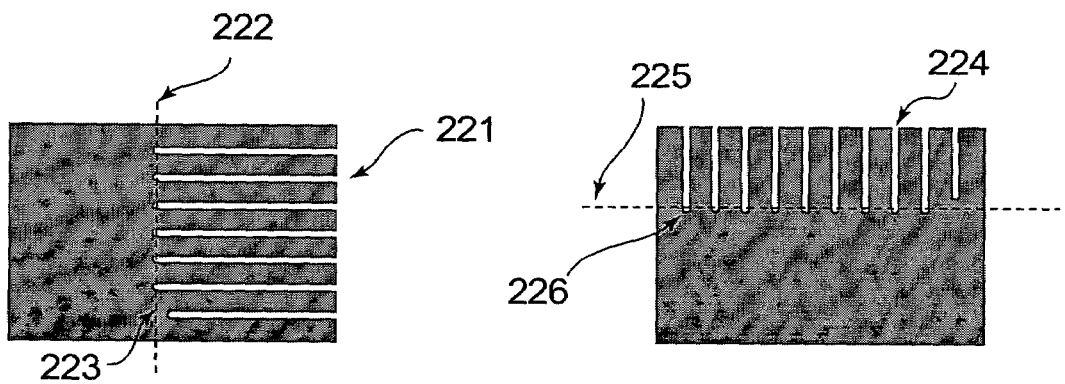
FIG. 22E
FIG. 22F
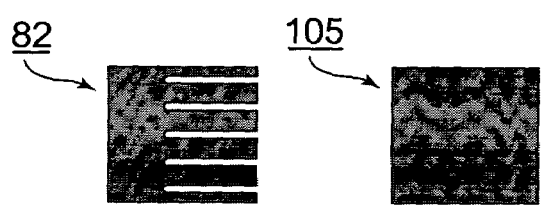

FIG. 28

$$MD = \sum_{x=1}^{1024} \sum_{y=1}^{768} \left| P_n(x, y) - P_{n-1}(x, y) \right|$$

FIG. 29

$$\begin{cases} AreaSize = AreaX \times AreaY = (DotDist \times 2)^2 \\ AreaPix = DotPix \times 4 \end{cases}$$

FIG. 30

(AreaPix − (PixError×AreaDot)) < CountNow
&&
CountNow < (AreaPix + (PixError×AreaDot))

FIG. 31A $$g(x, y) = \sqrt{(Fr1)^2 + (Fr2)^2}$$
$$= \sqrt{(f(x,y) - f(x+1, y-1))^2 + (f(x+1, y) - f(x, y-1))^2}$$

$Fr1 = 1 \cdot f(x,y) + 0 \cdot f(x+1,y) + 0 \cdot f(x, y-1) - 1 \cdot f(x+1, y-1)$
$\quad\;\, = f(x,y) - f(x+1, y-1)$ $Fr2 = 0 \cdot f(x,y) + 1 \cdot f(x+1, y) - 1 \cdot f(x, y-1) + 0 \cdot f(x+1, y-1)$
$\quad\;\, = f(x+1, y) - f(x, y-1)$

FIG. 31B $$\rho = x\cos\theta + y\sin\theta$$

FIG. 32A $45° \leq \theta < 135°$ $$\begin{pmatrix} \sin \theta : 0.707 \sim 1 \sim 0.707 \\ \cos \theta : 0.707 \sim 0 \sim -0.707 \end{pmatrix}$$

FIG. 32B $135° \leq \theta < 225°$ $$\begin{pmatrix} \sin \theta : 0.707 \sim 1 \sim -0.707 \\ \cos \theta : -0.707 \sim -1 \sim -0.707 \end{pmatrix}$$

FIG. 33

$$\begin{cases} \text{AreaSize} = \text{AreaX} \times \text{AreaY} \\ \qquad = (\text{DotDist} \times \frac{2+\sqrt{3}}{2}) \times (\text{DotDist} \times \sqrt{3}) \\ \text{AreaPix} = \text{DotPix} \times 3 \end{cases}$$

IMAGING APPARATUS, IMAGE PROCESSING METHOD FOR IMAGING APPARATUS AND RECORDING MEDIUM

BACKGROUND OF THE INVENTION

1. Field of the Invention

The present invention relates to an imaging apparatus, an image processing method of the imaging apparats and a recording medium.

2. Description of the Related Art

Recently, there is an imaging apparatus which shoots an original, placed by a user on a stage, by a camera, stores image data of the original shot by the camera, performs image processing on that data, and projects a zoomed-up image of the original on a screen by a projector.

For example, Unexamined Japanese Patent Application KOKAI Publication No. 2002-354331 discloses an imaging apparatus which shoots an original from an oblique direction, and corrects the distortion of an obtained image. As illustrated in FIGS. 26A and 26B, the pole brace 52 of the imaging apparatus is movable so as to change the direction of the camera section 51. When the camera section 51 is provided directly overhead the original stage 53 as illustrated in FIG. 26A, and an original (paper) placed on the original stage 53 is shot by the camera section 51, an image as illustrated in FIG. 27A can be obtained.

A shadow of the camera section 51 may appear on an image shot by the camera section 51 by some directions of a light or the like in a room on which the imaging apparatus is placed. In this case, as illustrated in FIG. 26B, the camera section 51 is placed obliquely upward on the original, not directly overhead of the original. When the camera section 51 is placed in such a way, and the original placed on the original stage 53 is shot an image as illustrated in FIG. 27B can be obtained.

The imaging apparatus performs image processing on the obtained image, and executes correction by clipping the image of the original, thereby generating an image as if it has been shot from the front.

To perform such a process, the conventional imaging apparatus specifies a part of the original and that of the stage being present in the shot image obtained by the shooting, acquires the outline of the image of the original, and clips that image.

The conventional imaging apparatus, however, may be unable to specify the part of the original and that of the stage in the shot image in some sizes of the original, colors thereof, and the locations thereof placed on the stage, so that the accuracy of acquiring the outline of the image of the draft decreases. In this case, when the image of the part of the original is clipped, and the image as if to be shot from the front is generated, the image of the part of the original is distorted. Accordingly, an imaging apparatus which can accurately specify a boundary between the part of the original and that of the stage, and can clip the image of the part of the original has been desired.

SUMMARY OF THE INVENTION

The present invention has been made in view of such a conventional problem, and, it is an object of the present invention to provide an imaging apparatus, an image processing method for the imaging apparatus, and a recording medium which are suitable for accurately acquiring an outline of an image of an original.

To achieve the object, an imaging apparatus according to the first aspect of the invention comprises:

a reference mark determination section (203) which determines an area in which a reference mark is present, from a shot image obtained by shooting a stage (13) on which the reference marks of known shapes are repeatedly laid out at predetermined intervals, and an original (5) placed on the stage (13);

a count section (203) which sets a check area (82) to the shot image, and determines the number of pixels of an area in which the reference mark determined by the reference mark determination section (203) is present, in the check area (82);

an area determination section (203) which compares the number of pixels determined by the count section (203) with a predetermined first numeric range, and determines that the check area (82) is an area occupied by the stage (13) if the number of pixels is within the first numeric range; and an acquisition section (203) which determines a boundary between the stage (13) and the original (5) based on a determination result of the area determination section (203), and acquires an area in which the original (5) is present.

For example, the reference marks may comprise dots (14) of known shapes laid out at predetermined intervals, and the reference mark determination section (203) may detect a set of pixels associated with a predetermined pixel value from the shot image, determine the number of pixels for individual sets of pixels, compares a determined number of pixels with a predetermined second numeric range, and determine that the set of pixels is the dot (14) if the determined number of pixels is within the second numeric range.

The acquisition section (203) may detect a straight line by applying Hough transform to the shot image, and take an area surrounded by the obtained straight line as the area in which the original (5) is present.

For example, the reference marks may comprise identification straight lines (211) of known shapes laid out at predetermined intervals, and the reference mark determination section (203) may detect a straight line longer than a predetermined length from the shot image, determine the number of pixels in which the detected straight line is present in the shot image, compare the determined number of pixels with a predetermined second numeric range, and determine that the detected straight line is the identification straight line (211).

The count section (203) may acquire a resolution of the shot image, set a range of the check area (82) based on the acquired resolution, and determine the number of pixels of the area in which the reference mark determined by the reference mark determination section (203) is present in the check area (82).

To achieve the object, an imaging apparatus according to the second aspect of the invention comprises:

an identification-straight-line determination section (203) which determines an identification straight line (211) from a shot image obtained by shooting a stage (13) on which the identification straight lines (211) of known shapes are repeatedly laid out at predetermined intervals and slopes, and an original (5) placed on the stage (13);

a boundary acquisition section (203) which determines an approximate straight line (213) which connects endpoints (212) of the identification straight lines (211) determined by the identification-straight-line determination section (203), and acquires a boundary between the stage (13) and the original (5); and an image-of-original acquisition section (203) which determines that an area surrounded by the boundary acquired by the boundary acquisition section (203) is an area in which the original (5) is present, and acquires an image of that area where the original (5) is present.

The image-of-draft acquisition section (203) may acquire an image of an area surrounded by the boundary or an outline of the shot image upon non-acquisition of the boundary by the boundary acquisition section (203).

The identification-straight-line acquisition section (203) may perform filtering on the shot image with a filter (214) which holds the identification straight line (211) only, thereby determining the identification straight line (211).

To achieve the object, an imaging apparatus according to the third aspect of the invention comprises:

an identification-straight-line determination section (203) which determines identification straight lines (221, 224) from a shot image obtained by shooting a stage (13) on which plural kinds of the identification straight lines (221, 224) of known shapes are repeatedly laid out at predetermined intervals and slopes in a direction that those straight lines intersect with one another, and an original (5) placed on the stage (13);

a boundary acquisition section (203) which determines approximate straight lines (222, 225) which connects endpoints (223, 226) of the identification straight lines (221, 224) determined by the identification-straight-line determination section (203), and acquires a boundary between the stage (13) and the original (5); and an image-of-original acquisition section (203) which determines that an area surrounded by the boundary acquired by the boundary acquisition section (203) is an area in which the original (5) is present, and acquires an image of that area where the original (5) is presents.

The image-of-draft acquisition section (203) may acquire an image of an area surrounded by the boundary or an outline of the shot image upon non-acquisition of the boundary by the boundary acquisition section (203).

The identification-straight-line acquisition section (203) may perform filtering on the shot image using a plurality of filters (227, 228) which hold the straight line (211) in the individual directions only, thereby determining the plurality of identification straight lines (221, 224).

To achieve the object, an image processing method for an imaging apparatus according to the fourth aspect comprises:

a reference mark determination step (203) of determining an area in which a reference mark is present, from a shot image obtained by shooting a stage (13) on which the reference marks of known shapes are repeatedly laid out at predetermined intervals, and an original (5) placed on the stage (13);

a count step (203) of setting a check area (82) to the shot image, and determining the number of pixels of an area in which the reference mark determined by the reference mark determination step (203) is present, in the check area (82);

an area determination step (203) of comparing the number of pixels determined by the count step (203) with a predetermined first numeric range, and determining that the check area (82) is an area occupied by the stage (13) if the number of pixels is within the first numeric range; and an acquisition step (203) of determining a boundary between the stage (13) and the original (5) based on a determination result of the area determination step (203), and acquires an area in which the original (5) is present.

To achieve the object, an image processing method for imaging apparatus according to the fifth aspect of the invention comprises:

an identification-straight-line determination step (203) of determining an identification straight line (211) from a shot image obtained by shooting a stage (13) on which the identification straight lines (211) of known shapes are repeatedly laid out at predetermined intervals and slopes, and an original (5) placed on the stage (13);

a boundary acquisition step (203) of determining an approximate straight line (213) which connects endpoints (212) of the identification straight lines (211) determined by the identification-straight-line determination step (203), and acquiring a boundary between the stage (13) and the original (5); and an image-for-original acquisition step (203) of determining that an area surrounded by the boundary acquired by the boundary acquisition step (203) is an area in which the original (5) is present, and acquiring an image of that area where the original (5) is present.

To achieve the object, an image processing method for an imaging apparatus according to the sixth aspect of the invention comprises:

an identification-Straight-line determination step (203) of determining identification straight lines (221, 224) from a shot image obtained by shooting a stage (13) on which plural kinds of the identification straight lines (221, 224) of known shapes are repeatedly laid out at predetermined intervals and slopes in a direction that those straight lines intersect with one another, and an original (5) placed on the stage (13);

a boundary acquisition step (203) of determining approximate straight lines (222, 225) which connect endpoints (223, 226) of the identification straight lines (221, 224) determined by the identification-straight-line determination step (203), and acquiring a boundary between the stage (13) and the original (5); and an image-of-original acquisition step (203) of determining that an area surrounded by the boundary acquired by the boundary acquisition step (203) is an area in which the original (5) is present, and acquiring an image of that area where the original (5) is present.

To achieve the object, a recording medium according to the seventh aspect of the invention has recorded a program which allows a computer to execute:

a reference mark determination step (203) of determining an area in which a reference mark is present, from a shot image obtained by shooting a stage (13) on which the reference marks of known shapes are repeatedly laid out at predetermined intervals, and an original (5) placed on the stage (13);

a count step (203) of setting a check area (82) to the shot image, and determining the number of pixels of an area in which the reference mark determined by the reference mark determination step (203) is present, in the check area (82);

an area determination step (203) of comparing the number of pixels determined by the count step (203) with a predetermined first numeric range, and determining that the check area (82) is an area occupied by the stage (13) if the number of pixels is within the first numeric range; and an acquisition step (203) of determining a boundary between the stage (13) and the original (5) based on a determination result of the area determination step (203), and acquires an area in which the original (5) is present.

To achieve the object, a recording medium according to the eighth aspect of the invention has recorded a program which allows a computer to execute:

an identification-straight-line determination step (203) of determining an identification straight line (211) from a shot image obtained by shooting a stage (13) on which the identification straight lines (211) of known shapes are repeatedly laid out at predetermined intervals and slopes, and an original (5) placed on the stage (13);

a boundary acquisition step (203) of determining an approximate straight line (213) which connects endpoints (212) of the identification straight lines (211) determined by the identification-straight-line determination step (203), and acquiring a boundary between the stage (13) and the original (5); and an image-of-original acquisition step (203) of determining that an area surrounded by the boundary acquired by the boundary acquisition step (203) is an area in which the original (5) is present, and acquiring an image of that area where the original (5) is present.

To achieve the object, a recording medium according to the ninth aspect of the invention has recorded a program which allows a computer to execute:

an identification-straight-line determination step (203) of determining identification straight lines (221, 224) from a shot image obtained by shooting a stage (13) on which plural kinds of the identification straight lines (221, 224) of known shapes are repeatedly laid out at predetermined intervals and slopes in a direction that those straight lines intersect with one another, and an original (5) placed on the stage (13);

a boundary acquisition step (203) of determining approximate straight lines (222, 225) which connect endpoints (223, 226) of the identification straight lines (221, 224) determined by the identification-straight-line determination step (203), and acquiring a boundary between the stage (13) and the original (5); and an image-of-original acquisition step (203) of determining that an area surrounded by the boundary acquired by the boundary acquisition step (203) is an area in which the original (5) is present, and acquiring an image of that area where the original (5) is present.

According to the invention, the outline of the image of the original can be accurately acquired.

BRIEF DESCRIPTION OF THE DRAWINGS

These objects and other objects and advantages of the present invention will become more apparent upon reading of the following detailed description and the accompanying drawings in which:

FIG. 4 is a block diagram illustrating the structure of a document camera;

FIGS. 11A and 11B are explanatory diagrams of the Hough transform;

FIG. 12 is an explanatory diagram of affine transformation;

FIGS. 21A to 21E are diagrams illustrating an oblique-line pattern to be identified by an imaging apparatus of a third embodiment of the invention, and the content of a process for a shot image of that pattern;

FIGS. 22A to 22F are diagrams illustrating horizontal-and-vertical-line pattern to be identified by an imaging apparatus of a fourth embodiment of the invention, and the content of a process for a shot image of that pattern;

FIG. 28 is a diagram showing an equation for determining an image change;

FIG. 29 is a diagram showing equations for determining the number of pixels in a check area;

FIG. 30 is a diagram showing conditional expressions for determining whether or not the check area is an area which corresponds to the stage;

FIGS. 31A and 31B are diagrams showing relational expressions of a pixel value before and after transformation by the Roberts filter;

FIGS. 32A and 32B are diagrams showing relational expressions of coordinates before and after the Hough transform; and FIG. 33 is a diagram showing equations for defining the range of $\theta$ for checking a vote number by the Hough transform.

DETAILED DESCRIPTION OF THE PREFERRED EMBODIMENTS

Imaging apparatuses according to embodiments of the invention will now be explained with reference to the accompanying drawings.

First Embodiment

Figure 1:
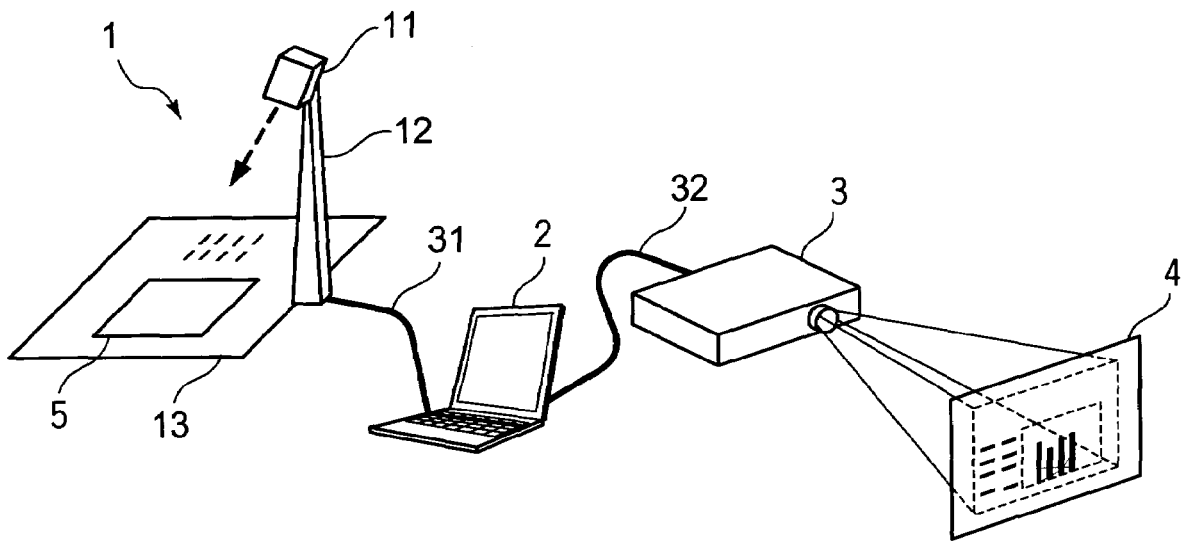
FIG. 1 is a diagram illustrating the structure of an imaging apparatus according to a first embodiment of the invention.

FIG. 1 illustrates the structure of an imaging system using an imaging apparatus of the first embodiment of the invention.

The imaging system includes a document camera 1, a computer 2, and a projector 3. The document camera 1 and the computer 2 are connected together via a communication cable 31, and the computer 2 and the projector 3 are connected together via a video footage cable 32.

Figure 2:
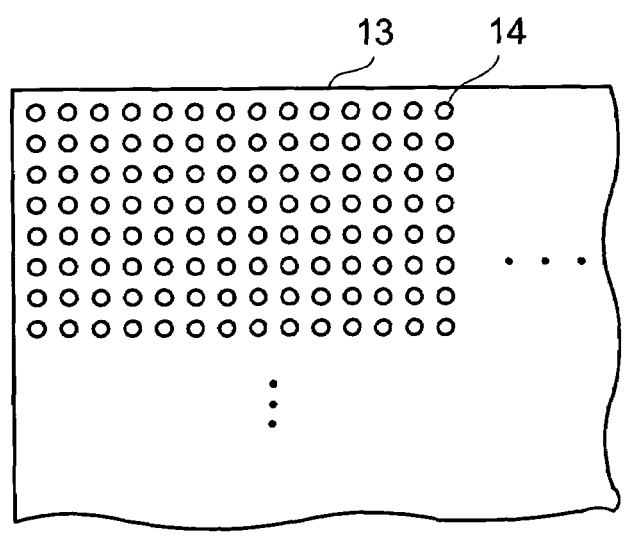
FIG. 2 is an explanatory diagram of dots marked on a stage.

The document camera 1 includes a camera section 11, a pole brace 12, and a stage 13. As illustrated in FIG. 2, to accurately acquire the outline of an original 5, dots 14 as reference marks for stage specification are repeatedly marked on a stage surface, on which the original 5 is placed, of the stage 13 at even intervals.

The camera section 11 is for shooting the original 5. For example, a digital camera is used as the camera section 11. The camera section 11 is mounted on the pole brace 12.

Figure 3A:
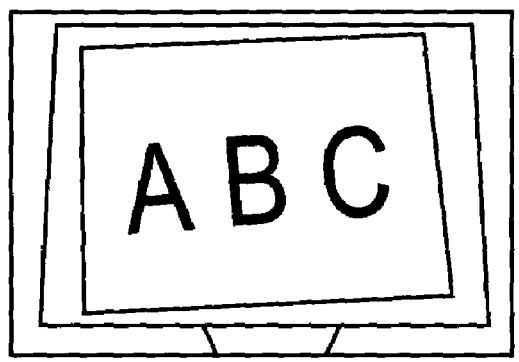
FIGS. 3A and 3B are explanatory diagrams of the function of the imaging apparatus.
Figure 3B:
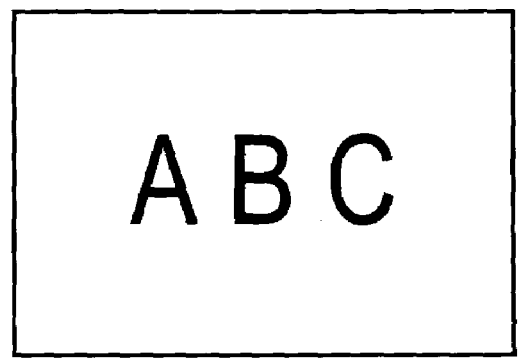

When the camera section 11 is directed toward the direction of the stage 13, the imaging apparatus shoots the stage 13 together with the original 5 placed on the stage 13. The imaging apparatus acquires an shot image illustrated in FIG. 3A, and converts the shot image into an image as if the original 5 was shot from the front as illustrated in FIG. 3B, and projects the converted image on a screen 4.

The computer 2 includes a CPU (Central Processing Unit), a ROM (Read Only Memory), a RAM (Random Access Memory), a storage (for example, a Hard Disk Drive), and the like. The computer 2 receives image data from the document camera 1 via the communication cable 31, decodes the compressed image data, and executes a rendering process or a process of saving a file. In case of document shooting, the computer 2 executes the rendering process, and supplies the projector 3 with the image data via the video footage cable 32. In case of board shooting, the computer 2 performs file saving on the decoded image data.

The projector 3 transforms the image data supplied from the computer 2 into a projection light in case of the document shooting, and irradiates the screen 4 with this projection light, thereby projecting the image data including the original 5 on the screen 4.

Next, the structure of the document camera 1 will be explained.

As illustrated in FIG. 4, the document camera 1 includes an image data generator 21, and a data processing section 22. The image data generator 21 and the data processing section 22 are included in the camera section 11 illustrated in FIG. 1. The image data generator 21 shoots the original 5 and captures image data of the original 5.

The data processing section 22 acquires the image data generated by the image data generator 21, and generates image data to be output to the projector 3.

The image data generator 21 includes an optical lens device and an image sensor 102.

The optical lens device 101 comprises, for example, a lens which condenses light, and shoots an object like the original 5. The optical lens device 101 has a peripheral circuit for correcting camera setting parameters such as a focal point, exposure, and a white balance.

The image sensor 102 comprises, for example, a CCD (Charged Coupled Device), and digitalizes image, which is formed by condensation by the optical lens device 101, thereby generating input image data.

The data processing section 22 comprises a memory 201, a video output device 202, an image processing section 203, an operation section 204, a program-code memory device 205, a CPU 206, and a PC interface device 207.

Figure 5:
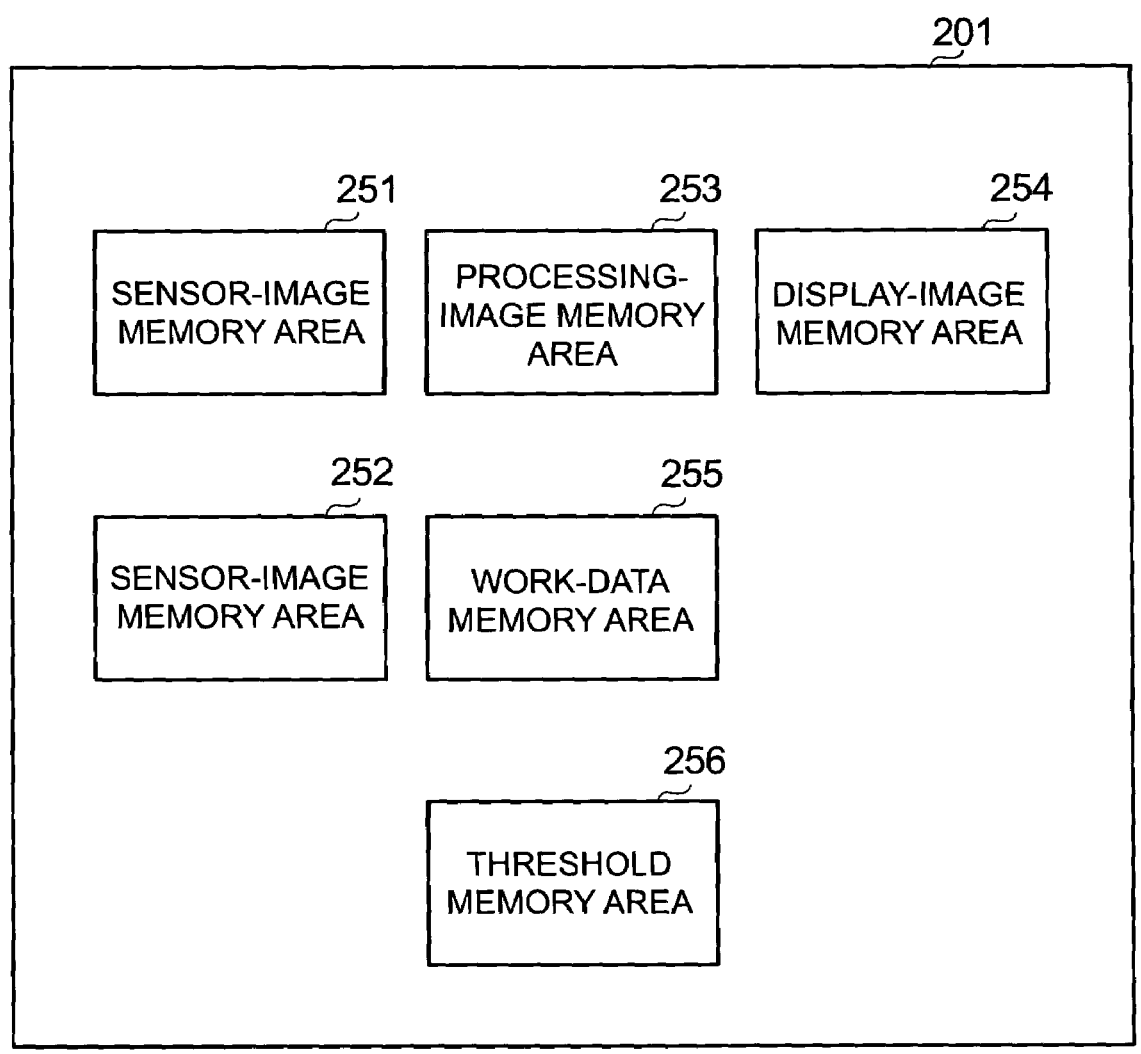
FIG. 5 is a block diagram illustrating each memory area of a memory.

The memory section 201 stores image data, values of various kinds of flags, thresholds, and the like. As illustrated in FIG. 5, the memory 201 includes sensor-image memory areas 251 and 252, a process-image memory area 253, a display-image memory area 254, a work-data memory area 255, and a threshold memory area 256, as areas in which those data are written.

The sensor-image memory areas 251 and 252 are areas for alternately storing image data captured by the image sensor 102, every time shooting takes place. The image sensor 102 allows the sensor-image memory areas 251 and 252, to alternately store the image data. That is, the memory 201 stores two image data, one currently captured by the image sensor 102, and the other previously captured by the image sensor 102. In reading out the image data, the image processing device 203 and the CPU 206 alternately read out the image data stored in the sensor-image memory areas 251 and 252. A process in which the CPU 206 reads out the image data from the sensor-image memory areas 251 and 252 will be discussed later in detail.

The process-image memory area 253 is an area in which image data, necessary for processes to be executed by the image processing device 203, is written. The work-data area 255 stores coordinate data, and various kinds of flags. The threshold memory area 256 stores the thresholds to be used for various determinations.

The video output device 202 generates an RGB signal based on the image data stored in the display-image memory area 254 of the memory 201. When connected to the projector 3, the video output device 202 outputs the generated RGB signal toward the projector 3. The video output device 202 may be so structured as to send the RGB signal toward the projector 3 via the computer 2.

The image processing device 203 is controlled by the CPU 206, and performs image processing on the image data stored in the sensor-image memory areas 251 and 252. Particularly, the image processing device 203 executes the following image processing to realize the functions of the document camera 1.

(1) Motion detection process
(2) Process of detecting a shooting object on the stage 13
(3) Original-image-outline Acquisition Process
(4) Image correction process (clipping and projection correction)
(5) Image clarification process Details of the processes (1) to (5) will be discussed later.

The operation section 204 is for acquiring operation information of a user, and has a power switch, a shutter, image correction key, and a shooting/reset key as a switch and keys for controlling the functions of the imaging apparatus.

The power switch is to turn the power of the document camera 1 on and off.

The shutter is a switch to be pressed at the time of shooting. The image correction key is operated in performing the image processing or correcting an image undergone the image processing, and is constituted by a plurality of keys.

The operation section 204 outputs the operation information at the time of operation of the switches, and the keys by the user toward the CPU 206.

The program-code memory device 205 stores a program to be executed by the CPU 206, and comprises, for example, a ROM.

The CPU 206 controls individuals sections in accordance with the program stored in the program-code memory device 205.

The PC interface device 207 converts the image data or the like into data in USB (Universal Serial Bus) format, sends this data toward the computer 2 via the communication cable 31, and receives data, a signal from the computer 2.

Next, the process to be executed by the CPU 206 will be explained.

To be more precise, the CPU 206 executes a camera basic process to be discussed later.

In the camera basic process, the CPU 206 sets a parameter for controlling the peripheral circuit or the like necessary for the camera section 11 to shoot the object. For example, this parameter includes parameters for setting such as the focus of the camera section 1, the shutter speed (exposure time), exposure like an aperture, a white balance, and ISO sensitivity. The CPU 206 executes auto focus measurement, photometry, etc., searches for the best condition for shooting an object, and executes control of setting those parameters to the image data generator 21.

The CPU 206 also executes, for example, the initialization of the memory 201, the initialization of data or the like to be used for the communication, the image processing, etc., and the process of setting a shooting mode.

As the operable shooting modes of the document camera 1 of the embodiment, there are a motion picture mode and a still picture mode. In motion picture mode, the CPU 206 allows the image data generator 21 to shoot an object at a low resolution. In contrast, the still picture mode allows the image data generator 21 to shoot an object at a high resolution. Because the amount of the image processing by the image processing device 203 and that of the image data displayed by the projector 3 are large, the still picture mode is suitable for a case where the object moves little. When setting the shooting mode, the CPU 206 stores information indicating the set shooting mode in the work-data memory area 255 of the memory 201.

In a case where the original 5 is placed on the stage 13 by the user, or the original 5 placed on the stage 13 is replaced by the user, the CPU 206 sets an image mode in the motion picture mode. In the motion picture mode, the CPU 206 controls the individual sections in such a manner as to performs motion picture projection on an image with an image resolution of, for example, XGA (1024×768 dots) or so, at the speed of 30 fps (frame/second).

When having determined that there has been no motion in a shooting range like a case where the image of the original 5 is projected with the original 5 kept to be placed on the stage 13, the CPU 206 sets the image mode in the still picture mode.

In the still picture mode, the CPU 206 allows the camera section 11 to perform image shooting at a high resolution. The CPU 206 acquires a clearer image of the original 5 with a higher resolution than that of the original 5 in the motion picture mode. The CPU 206 controls the individual sections as to project a still image with the high resolution. For example, if the camera section 11 is a camera with a shooting resolution of 3,000,000 pixels, the CPU 206 controls the individual sections as to generate a still image of XGA (1024×768) as a clipped projection image.

First, when the document camera 1 is powered on, the CPU 206 initializes various parameters for controlling the operations of the image data generator 21 and the image processing device 203. The CPU 206 controls the image data generator 21 to execute the shooting at a low resolution. The CPU 206 controls the image sensor 102 in such a way that data captured by the image sensor 102 are alternatively stored in the sensor-image memory areas 251 and 252.

For example, when the image sensor 102 acquires image data D1 at a certain time T1, the CPU 206 allows the image sensor 102 to store the image data D1 in the sensor-image memory area 251 (or the sensor-image memory area 252). When the image sensor 102 acquires image data D2 at the next time T2, the CPU 206 allows the image sensor 102 to store the image data D2 in the sensor-image memory area 252 (or the sensor-image memory area 251). Further, when the image sensor 102 acquires image data D3 at the next time T3, the CPU 206 allows the image sensor 102 to store the image data D3 in the sensor-image memory area 251 (or the sensor-image memory area 252) in an overwriting manner.

The CPU 206 alternatively reads out the image data from the sensor-image memory areas 251 and 252, writes the data in the process-image memory area 253, and allows the image processing device 203 to execute the motion detection process to be discussed later. The image processing device 203 executes the motion detection process, and sets data to a flag of Motion_Control_Flag, representing the result of the motion detection process. For example, when having determined that there has been a motion of an image, the image processing device 203 sets the flag of Motion_Control_Flag to "1", and when having determined that there is no motion of the image, the image processing device 203 sets that flag to "0".

The motion detection process is one of the image processes which are to be executed by the image processing device 203, and will be explained in detail later.

The CPU 206 refers to the flag of Motion_Control_Flag, stored in the work-data memory area 255 of the memory 201, and determines whether or not the object in the shooting range has moved.

When having determined that the object in the shooting range has moved, the CPU 206 sets the shooting mode in the motion picture mode.

In contrast, when having determined that the object in the shooting range is at rest, the CPU 206 allows the image processing device 203 to execute each process of (1) to (5).

Next, the image process to be executed by the image processing device 203 will be explained. As mentioned above, the image processing device 203 executes (1) the motion detection process, (2) the process of detecting a shooting object on the stage 13, (3) the original-image-outline acquisition process, (4) the image correction process (clipping and projection correction), and (5) the image clarification process. Each process will be explained below in detail.

(1. Motion Detection Process)

The motion detection process is for detecting the motion of the object like the shot original 5. The image processing device 203 executes this detection of the motion based on an image change MD. The image change MD is an amount representing how much a newly shot image changes from the previous one by comparing the newly shot image with the previously shot image. The image processing device 203 computes the image change MD based on the equations shown in FIG. 28.

If the image changes MD are computed for all pixels constituting image data obtained by shooting the original 5 or the like, the amount of computation for the image-motion detection process becomes large. Accordingly, predetermined pixels for computing the image changes MD may be appointed beforehand from all of the pixels, and the image processing device 203 may computes the image changes MD for the predetermined pixels.

To detect the motion of the object like the original 5, the image processing device 203 compares the image change MD with a preset threshold MD_th. If the image change MD is greater than the threshold MD_th, the image processing device 203 determines that the object has moved, and, if the image change MD is less than or equal to that threshold, the image processing device 203 determines that the object is at rest. The threshold MD_th is prestored in the threshold memory area 256 of the memory 201.

When the user replaces the original 5 or the like on the stage 13, for example, image data generated by the image data generator 21 changes, thus increasing the image change MD.

If the image change MD is greater than the threshold MD_th, the image processing device 203 detects that the shot object has moved.

In contrast, when the user finishes replacing the original 5 on the stage 13, for example, the value of the image change MD becomes smaller than that in the case where the original 5 or the like is being replaced. If the image change MD becomes less than or equal to the threshold MD_th, the image processing device 203 detects that the shot object is at rest.

Based on the result from the motion detection, the image processing device 203 sets the value of the flag of Motion_Result_Flag representing that result. That is, if the image change MD is greater than the threshold MD_th, the image processing device 203 sets the value representing that the object has moved, to the flag of Motion_Result_Flag. If the object has moved, for example, the image processing device 203 sets the value "1" to the flag of Motion_Result_Flag.

In contrast, if the image change MD is less than or equal to the threshold MD_th, the image processing device 203 sets the value, representing that the object is at rest, to the flag of Motion_Result_Flag. For example, if the object is at rest, the image processing device 203 sets "0" to the flag of Motion_Result_Flag.

The image processing device 203 stores the value, which is set to the flag of Motion_Result_Flag representing the result of the motion detection, in the work-data memory area 255 of the memory 201.

(2. Shooting Object Detection Process)

Figure 6:
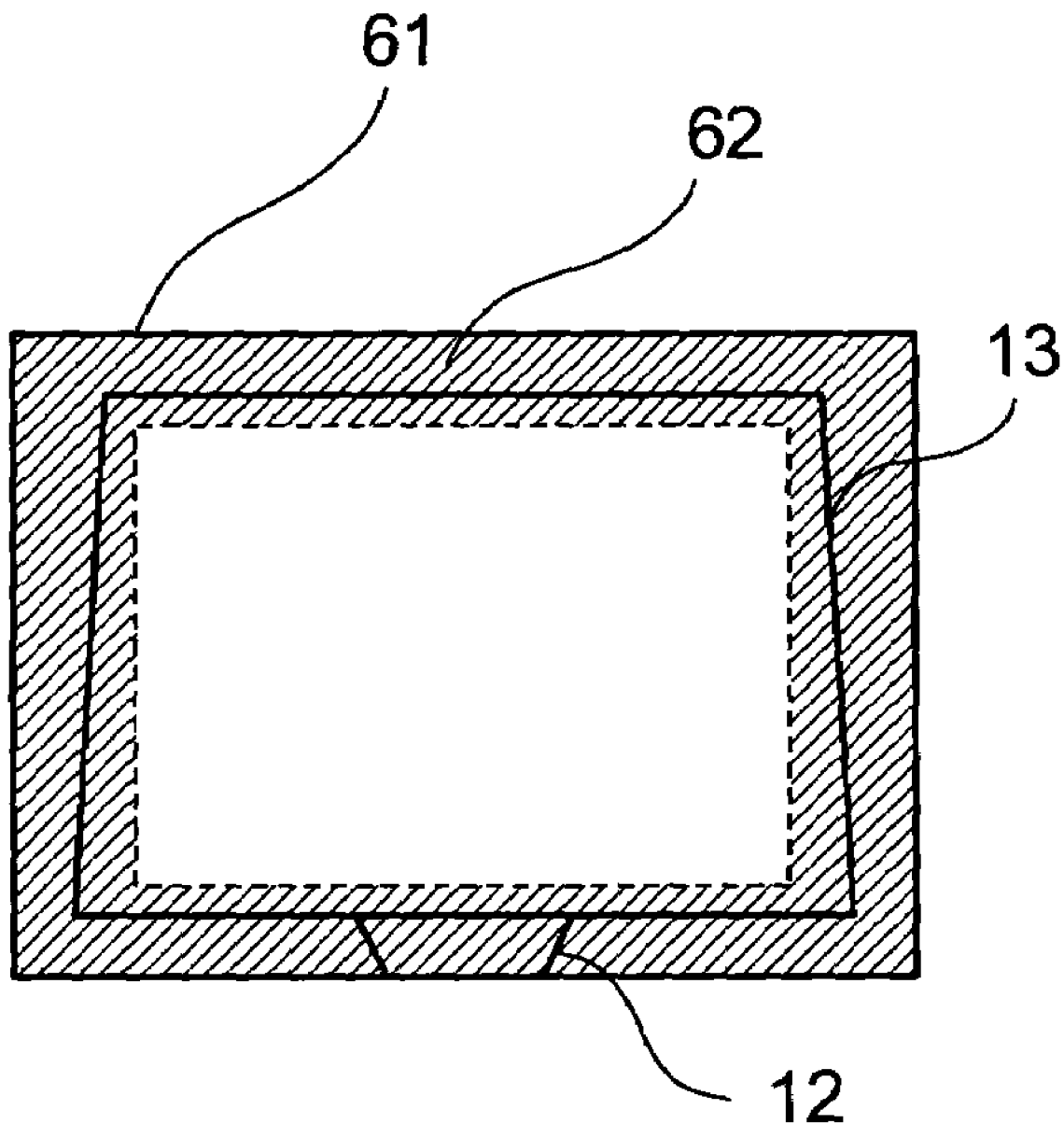
FIG. 6 is an explanatory diagram of mask data which is used in an object-to-be-projected detection process.

The shooting object detection process is for acquiring an energy PE of an edge image which performs masking on an assumed stage area to detect the image of the original 5 as the shooting object. As illustrated in FIG. 6, the image processing device 203 performs the masking on an area of the image of the assumed stage 13 in a shot image 61 obtained the image data generator 21 with a mask 62, and acquires the energy PE of the edge image. The energy PE of the edge image is determined based on the outline of the image of the original 5, and if the original 5 is placed on the stage 13, the energy PE becomes high in comparison with a case where the original 5 is not placed on the stage 13.

The image processing device 203 acquires the energy PE, and compares the acquired energy PE with a preset threshold PE_th. If the acquired energy PE is greater than the threshold PE_th, the image processing device 203 sets a predetermined value to the shooting object flag of Object_Flag which is used by the CPU 206 for determination of the presence/non-presence of the original 5, and stores the flag of Object_Flag in the work-data memory area 255 of the memory 201. For example, if it is determined that the original 5 is present on the stage 13, the CPU 206 sets the value "1" to the flag of Object_Flag. In contrast, if it is determined that the original 5 is not present on the stage 13, the CPU 206 sets the value "0" to the flag of Object_Flag.

If the acquired energy PE is less than or equal to the threshold PE_th, the image processing device 203 resets the flag value of the shooting object flag, and stores that flag in the work-data memory area 255 of the memory 201. For example, if it is determined that the original 5 is not present on the stage 13, the CPU 206 sets "0" to the flag of Object_Flag.

(3. Original-Image-Outline Acquisition Process)

The outline acquisition process is for acquiring the outline portion of the original 5 from the shot image 61 obtained by the image data generator 21. If the original 5 is a quadrangle, the outline is the four sides of that quadrangle.

At this process, if the distortion of the shot image 61 is large, the image processing device 203 executes a distortion correction process for correcting the locations of coordinates in accordance with distances from the center of the shot image 61, and acquires a more accurate outline.

Figure 7A:
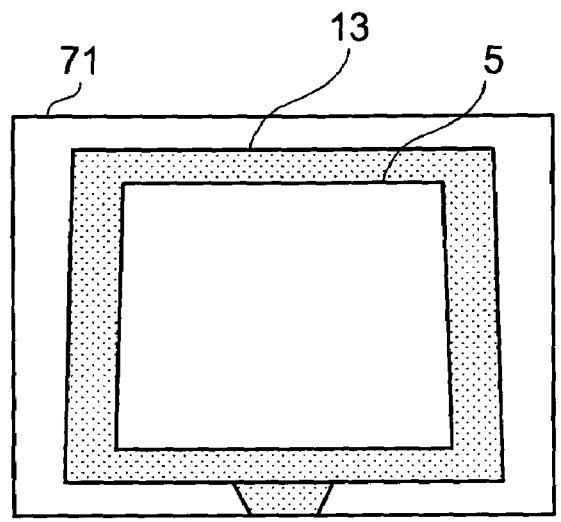
FIGS. 7A and 7B are explanatory diagrams of a binarized image.

To obtain the outline of the image of the original 5, the image processing device 203 generates a binarized image 71 represented by pixel values each being 0 or 1, as illustrated in FIG. 7A. The image processing device 203 compares each pixel value of an image obtained by the shooting at the still picture mode with a preset threshold, and generates the binarized image 71. The image processing device 203 stores the generated binarized image 71 in the process-image memory area 253. The memory 201 prestores the threshold in the threshold memory area 256.

Figure 7B:
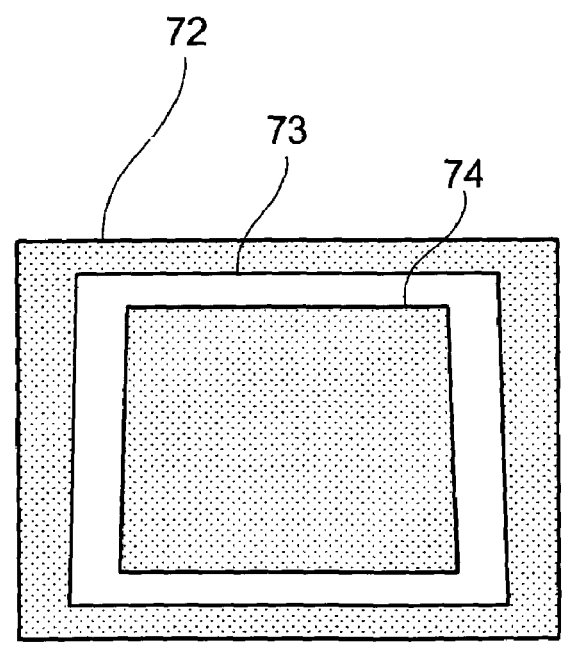

Further, the image processing device 203 performs image processing to be discussed later on the stored binarized image 71, expresses an area 73 of the stage image in white as illustrated in FIG. 7B, and acquires a binarized image 72 which clarifies the boundary between the area 74 of the image of the original 5, and the area 73 of the stage image.

Figure 8A:
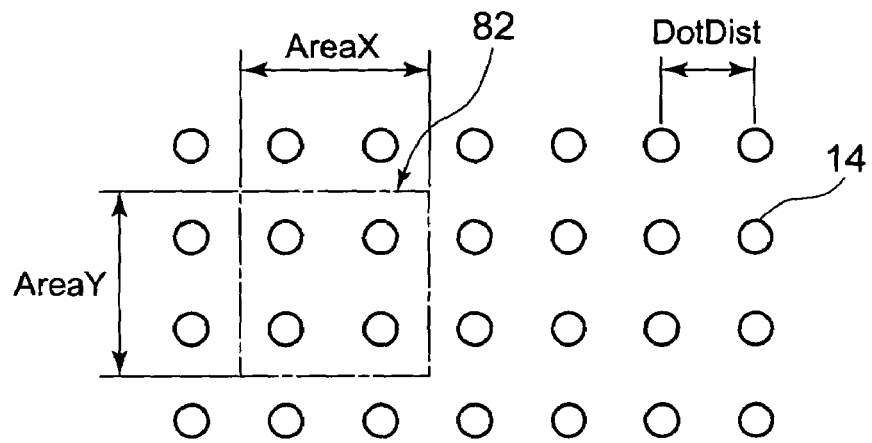
FIGS. 8A and 8B are diagrams illustrating a pattern of the dots laid out on the stage at equal intervals.
Figure 8B:
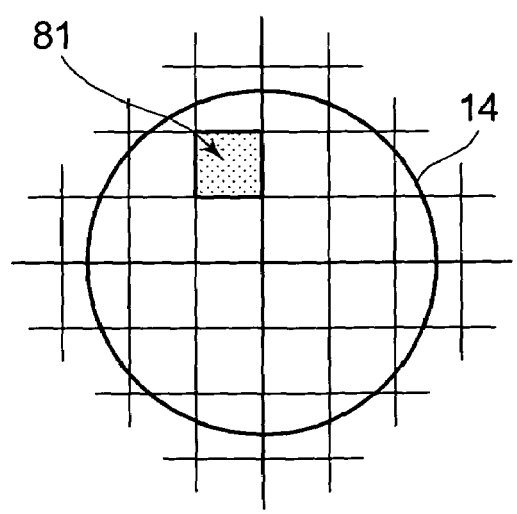

Accordingly, using the dots 14 marked on the stage 13 as illustrated in FIG. 2, the image processing device 203 acquires stage specification information. The camera section 11 shots the stage 13 and the original 5 as the objects to be shot, thereby acquires dot images as illustrated in FIG. 8A. As illustrated in FIG. 8B, each dot image is an aggregate of pixels 81. One pixel corresponds to one of the pixels which constitute the shot image 61 to be generated by the image data generator 21, and the number of pixels is determined by the characteristic of the camera section 11.

The image processing device 203 determines the resolution (DPI: Dot Per Inch) of the shot image 61 from a shooting distance and an angle of view as the shooting conditions of the camera section 11. From the determined resolution, the image processing device 203 acquires DotPix, DotDist, AreaSize, and AreaPix as the stage specification information.

DotPix represents the number of pixels of the image of one dot 14. DotDist represents the number of pixels between the central coordinates of the dot images as illustrated in FIG. 8A.

AreaSize represents the number of pixels of a check area 82 which takes the individual lengths of the side as AreaX and AreaY. The check area 82 is for checking the area of the image of the stage 13. In the case of this figure, the check area 82 is a quadrangle including the four dots 14.

AreaPix represents the number of pixels of the images of the four dots 14 in the check area 82. The number of pixels of AreaSize and the number of pixels of AreaPix can be expressed by the equations shown in FIG. 29.

For example, if the number of pixels of DotPix in the check area 82 is 17, the number of pixels of AreaPix becomes 68 (17×4).

The check area 82 is not limited to an area which has the four dots 14. The number of dots in the check area 82 is less, the pixels become fine, and the checking accuracy becomes high. The less number of dots, however, makes detection of the patterns of the dots difficult. Accordingly, it is desirable that the check area 82 should be set based on the checking accuracy and the detection accuracy of the dot pattern.

As the resolution of the shot image 61 to be generated by the image data generator 21 is changed by zooming, the values of those stage specification information change in accordance with a zoom value.

Next, if the reference marks marked on the stage 13 are the dots 14, the image processing device 203 performs a labeling process on the binarized image 71. The labeling process links the pixels with the same pixel value, assigns the same number (label) to the linked pixels, and assigns different numbers to the non-linked pixels.

An explanation will be given of the labeling process to be executed by the image processing device 203.

Figure 9A:
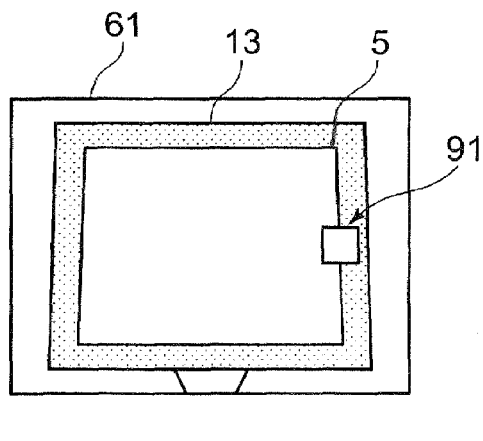
FIGS. 9A to 9C are explanatory diagrams of a labeling process.
Figure 9B:
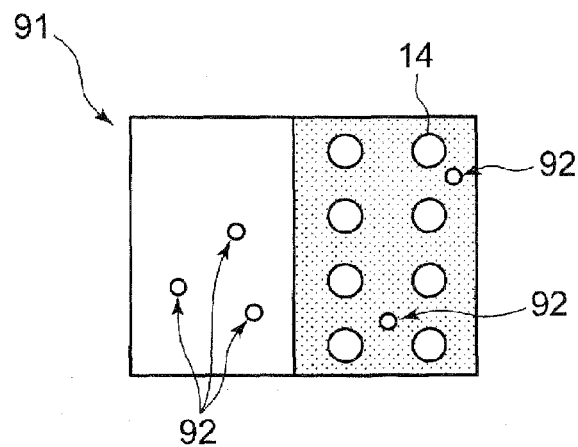

In the shot image 61 illustrated in FIG. 9A, when an area 91 including the boundary between the image of the stage 13 and that of the original 5, the image of the area 91 becomes an image illustrated in FIG. 9B. As illustrated in FIG. 9B, this image may contain noises 92.

Figure 9C:
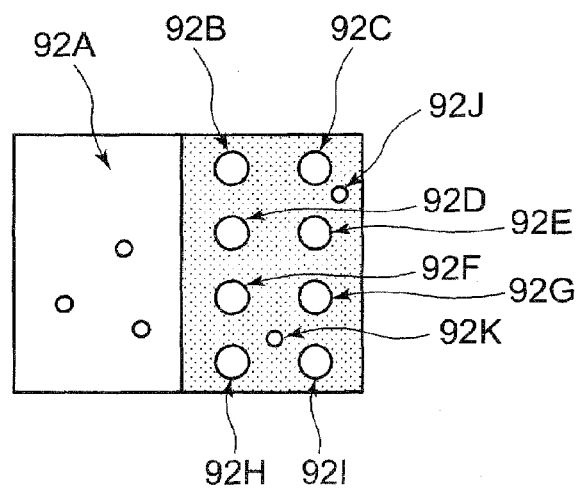

The image processing device 203 executes the labeling process, thereby linking adjoining pixels with the same pixel value as that of the image of the dot 14, and acquires areas 92A to 92K as illustrated in FIG. 9C. The image processing device 203 assigns different numbers on the respective linked areas 92A to 92K.

Next, the image processing device 203 individually counts the numbers of pixels in the areas 92A to 92K, and compares the counted number of pixels of NowDotPix with an error range (DotPix±PixError) preset to the number of pixels of Dotpix of the image of one dot 14. PixError is an assumed error, and the memory 201 stores the assumed error of PixError in the threshold memory area 256.

Figure 10A:
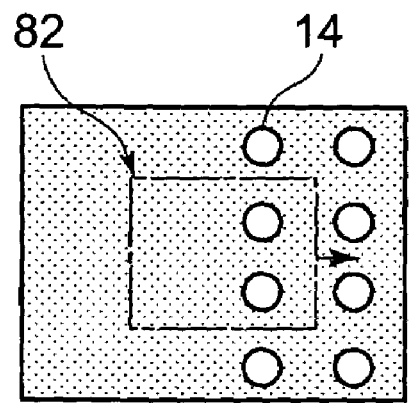
FIGS. 10A to 10C are diagrams for explaining a stage-pattern-area acquisition process.

If the number of pixels of NowDotPix is greater than the error range (DotPix±PixError) like the areas 92A, 92J, and 92K, the image processing device 203 determines that those areas are not the image of the dot 14. The image processing device 203 writes pixel values which differ from the pixel value of the image of the dot 14 in all pixels of an output image 105 which corresponds to the area determined in such a manner. The image processing device 203 generates an image with dots 14 only as illustrated in FIG. 10A. For example, the image processing device 203 writes "1" in the pixels of the portion of the output image 105 determined as the image of the dot 14, and writes "0" in the other portions.

Figure 10B:
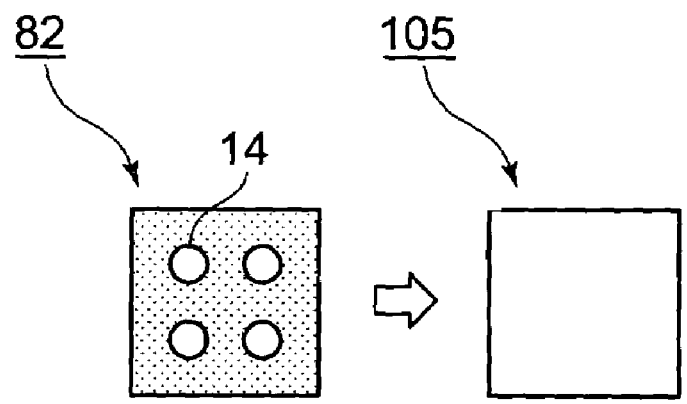

Next, as illustrated in FIG. 10A, the image processing device 203 sets the check area 82 to the image with, for example, the coordinates of the upper left corner being as (column, line). As illustrated in FIG. 10B, the image processing device 203 counts the number of pixels of the portion determined as the image of the dot 14 in the check area 82, and compares the counted number of pixels CountNow with the error range (AreaPix±PixError×AreaDot).

AreaDot is the preset number of dots in the check area 82, and is four in the embodiment. The image processing device 203 determines whether or not the check area 82 is the area of the image of the stage 13 in accordance with the equations shown in FIG. 30.

The image processing device 203 stores the output image 105 in the process-image memory area 253 separately from the prestored binarized image 71. If the discriminants of FIG. 29 are satisfied, that is, as illustrated in FIG. 10B, if the number of pixels of CountNow is within the error range, the image processing device 203 determines that the check area 82 is the area of the image of the stage 13, and writes the pixel values "1(white)" in all pixels of the output image 105 which corresponds to the check area 82.

Figure 10C:
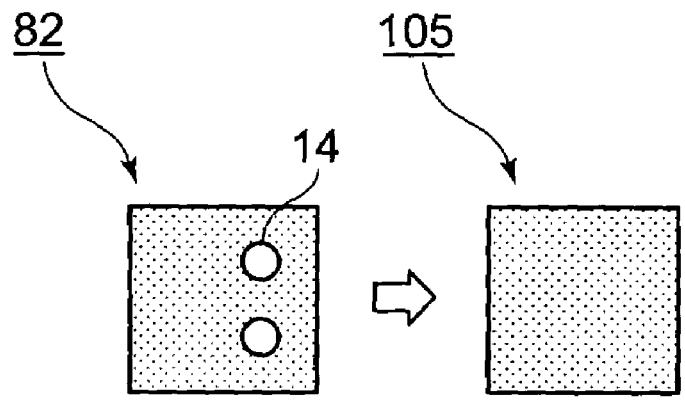

If the discriminants are not satisfied like a case where the number of pixels countNow is out of the error range as illustrated in FIG. 10C, the image processing device 203 determines that the check area 82 is not the area of the image of the stage 13, and writes the pixel values "0(black)" in all of the pixels of the output image 105 which corresponds to the check area 82.

The image processing device 203 executes the labeling process in the shot image 61 while shifting the check area 82 pixel-by-pixel, and acquires the binarized image 72 as illustrated in FIG. 7B.

According to the labeling process, the boundary between the area of the image of the original 5 and that of the image of the stage 13 can be determined regardless of the location of the original 5 placed on the stage 13, even though the original 5 has any size, and the color of the original 5 is not clear.

The image processing device 203 uses a filter for detecting an edge such as called Roberts filter with respect to the binarized image 72 generated in such a way. The Roberts filter detects the edge of an image by weighting two groups of four neighboring pixels to acquire two filters Fr1 and Fr2, and averaging them.

If the Roberts filters are applied to the pixel values f(x,y) of some focused coordinates (x,y), the pixel values g(x,y) undergone transformation can be expressed by the equations shown in FIG. 31A.

Using the Roberts filters Fr1 and Fr2 in this manner, the image processing device 203 generates an edge image, and executes the Hough transform for the generated edge image, and detects straight lines forming the outline of the stage 13.

The Hough transform is the technique that transforms the coordinates of a point constituting a straight line 113 on the X-Y plane illustrated in FIG. 11A, with the equation shown in FIG. 31B, votes it on the ρ-θ plane 112 illustrated in FIG. 11B, thereby transforming it into a vote number Nvote on the ρ-θ plane.

In general, when the Hough transform is executed for each point (x,y) on the same straight line within the range of an angle θ from 0° to 360°, the straight line is transformed into one point on the ρ-θ plane 112 (Hough plane). That is, The point (ρ,θ) on the ρ-θ plane 112 represents the straight line on the x-y plane 111. The vote number is to be the number of pixels on the straight line on the x-y plane 111. That is, the vote number corresponds to the length of the straight line. A point on the ρ-θ plane 112 with a less vote number in comparison with others represents a short straight line. In this case, the image processing device 203 can exclude that point from a candidate to be assumed as a straight line representing the edge of the original 5.

To improve a processing speed, the image processing device 203 can reduce the number of points to be checked and that of the angles θ at the time of the Hough transform. This technique will now be explained.

In the technique with the Hough transform, as the numbers of points to be checked and angles θ becomes large, the amount of data to be processed increases, thus lowering the process speed. To avoid the lowering of the process speed, the image processing device 203 thins out data at predetermined intervals in both of X an Y directions to be checked at the time of detecting the edge, and reduces the edge image. Accordingly, the number of points to be checked can be reduced.

The image processing device 203 can reduce the check angle by the following technique.

In the edge image to be checked, ρ becomes not only positive value but also negative value in considering a coordinate system with the origin at the center of an image, and if the angle θ is measured within the range of 0°≦θ<180°, ρ becomes negative value in the remaining range of 180°≦θ<360°.

If the center of the quadrangular original 5 is located around the center of the image, the respective sides of the original 5 to be actually shot are present on the right, left, top and bottom. In this case, the measurement carried out within the range expressed by the equations of FIGS. 32A and 32B is effective rather than to check the vote number on the ρ-θ plane 112 within the range of 0°≦θ<180°.

It is possible to specify the up or down side, or the right or left side according to the positive or negative value of the vote number ρ. For example, the range of θ expressed by the equations of FIG. 31A corresponds to the up or down side of the quadrangular original 5, and the range of θ expressed by the equation of FIG. 31*b* corresponds to the right or left side of the quadrangular original 5. In this manner, in a case where the center of the original 5 is located around the center of the image, it is possible to efficiently select the sides constituting the outline.

In a case of shooting a document, the camera section 11 shoots the original 5 approximately overhead the original 5, the distortion of the shape (quadrangle) of the image of the original 5 becomes less. In a case where the original 5 is a piece of sheet based on a general standard (for example, sheet of A4 size or B5 size), the opposing sides of the original 5 are parallel, the lateral and longitudinal sides interest one another at approximately right angles.

The straight lines with same θ can be parallel each other among the straight lines forming the respective sides. If there are two groups of parallel lines in the straight lines intersect at right angles in different directions, a quadrangle representing the outline of the original 5 can be specified.

From those straight lines, the image processing device 203 determines candidates to form the sides which represent the outline of the original 5. For example, if there are plural candidates for each side, an innermost straight line is taken as one side, and if there is only one straight line as the candidate, that straight line is taken as the one side.

(4. Image Correction Process)

The image correction process is for including clipping of an image, projection correction, and the like. The clipping process clips the image of the original 5 as the shooting object from the shot image based on the outline of the extracted quadrangle. As it is not limited that the camera section 1 shoots the original from the front, the clipped image of the original 5 may be distorted.

The projection-correction process performs projection transformation on the clipped image of the original 5, thereby correcting the distortions of the original 5 and the image on the screen 4. To correct the distortions, the image processing device 203 uses the affine transformation which is widely adapted for the spatial transformation of image data.

As illustrated in FIG. 12, the image processing device 203 computes an affine parameter Aprj for the affine transformation from an original image 121 of the original 5 or the like, and determines a reverse transformation Arev of the computed affine parameter Aprj. The image processing device 203 determines a pixel point p(x,y) of the original image 121 which corresponds to each pixel P(u,v) of the image 122 undergone the projection correction with the inverse transformation Arev. That is, the image processing device 203 acquires an image 122 of a case where the original 5 or the like is shot from the front by the projection correction process.

(5. Image Clarification Process)

The image clarification process is for performing enlargement of a resolution, color correction, and the like, on the clipped image so as to correct to an image with a good visibility.

To perform the image clarification process, the image processing device 203 extracts parameters for correcting an image effect from the clipped image. These parameters are the maximum, minimum, and peak values of the brightness histogram, the peak and average values of the color difference histogram, and the like. The image processing device 203 converts the extracted parameters for correcting the image effect into the values so as to clarify the image, thereby performing the image clarification process.

Next, the operation of the imaging apparatus according to the first embodiment will be explained.

When the user turns on eh document camera 1, the CPU 206 of the document camera 1 reads out the program code from the program-code memory area 205 to execute the camera basic process.

Figure 13:
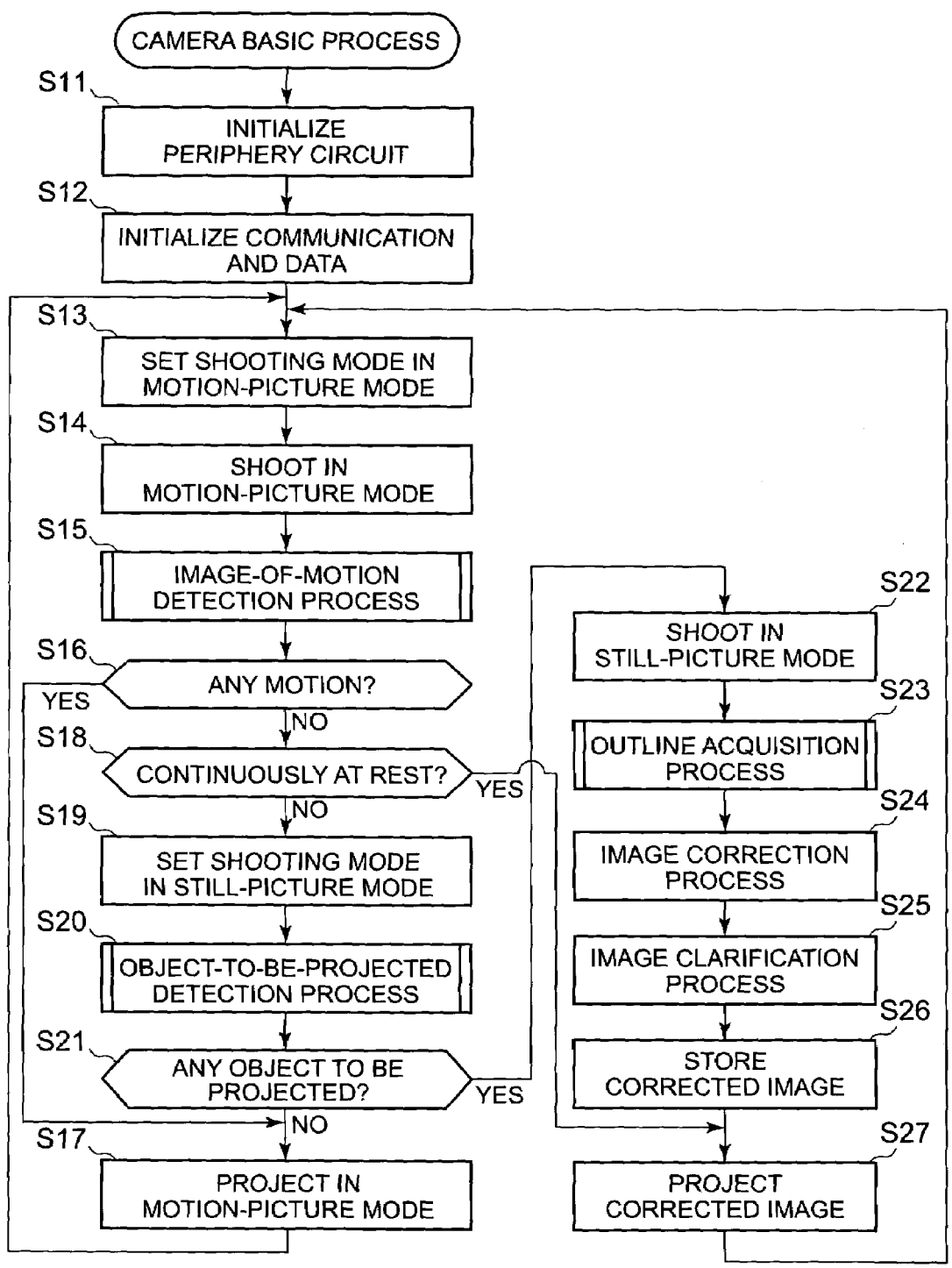
FIG. 13 is a flowchart for explaining a camera basic process.

The camera basic process will be explained with reference to the flowchart illustrated in FIG. 13. The CPU 206 controls the peripheral circuit of the optical lens device 101 to carry out the initialization of the camera setting parameters such as a focal point, exposure, and a white balance of the optical lens device 101 (step S11).

The CPU 206 initializes data to be used for the communication, the image process, and the like (step S12).

The CPU 206 sets the mode in the motion-picture mode (step S13).

The CPU 206 controls the optical lens device 101, and shoots the original 5 or the like in the motion-picture mode (step S14).

The CPU 206 executes the image-of-motion detection process (step S15). In the image-motion detection process, when it is determined that there has been a motion in the shot image, the image processing device 203 sets "1" to the motion detection result flag of Motion_Result_Flag. When it is determined that there is no motion in the shot image, the image processing device 203 sets "0" to that flag. The flow of the image-motion detection process will be explained in detail later.

When the image processing device 203 executes the motion detection process, the CPU 206 determines whether or not the object to be shot has been moved or not based on the content of eth motion-detection-result flag of Motion_Result-_Flag (step S16).

When the value indicating the motion of the shot image is set to the motion-detection-result flag of Motion_Result-_Flag (step S16: YES), the CPU 206 determines that the object to be shot has moved. The CPU 206 projects the image shot in the motion-picture mode on the screen 4 (step S17). The CPU 206 executes the shooting process in the motion-picture mode, and repeats the processes at the steps S13 to S15.

At the step S16, if the value indicating that there has been no motion in the shot image is set to the motion-detection-result flag of Motion_Result_Flag (step S16: NO), the CPU 206 determines that there has been no motion in the shot image. The CPU 206 determines whether or not the no-motion state has been continued (step S18).

When having determining that there is no motion in the shot image at first, that is, when having determining that the motion of the moving object becomes at the rest (step S18: NO), the CPU 206 sets the shooting mode in the still-picture mode (step S19).

The CPU 206 allows the image processing device 203 to execute an object-to-be-projected detection process (step S20). In the object-to-be-projected detection process, when having determining that the document 5 is placed on the stage 13, the image processing device 203 sets "1" to the shooting object flag of Object_Flag. When having determining that the document 5 is not placed on the stage 13, the image processing device 203 sets "0" to that flag. The flow of the object-to-be-projected detection process will be explained in detail later.

When the image processing device 203 executes the object-to-be-projected detection process, the CPU 206 refers the value of the shooting object flag of Object_Flag, and determines whether or not the original 5 as the object-to-be-projected is placed on the stage 13 (step S21).

If the value indicating that the original 5 is placed on the stage 13 is set to the shooting object flag of Object_Flag (step S21: YES), the CPU 206 determines that the original 5 is placed on the stage 13. The CPU 206 executes the shooting process in the still-picture mode (step S22).

The CPU 206 so controls the image processing device 203 as to allow this device to performs the outline acquisition process on the shot image (step S23). The flow of the outline acquisition process will be explained in detail later.

The CPU 206 so controls the image processing device 203 as to allow this device to execute the image correction process such as the clipping of the image of the original 5, the projection correction, and the like (step S24).

The image processing device 203 executes the image clarification process such as the enlargement of the resolution of the image and the color correction, and acquires image data with a good visibility (step S25). The image processing device 203 stores the corrected image data undergone the image clarification process in the display-image memory area 254 of the memory 201 (step S26).

The CPU 206 projects the corrected image obtained by the image clarification process of the image processing device 203 on the screen 4 (step S27).

When projecting the image on the screen 4, the CPU 206 sets the shooting mode in the motion-picture mode, executes the shooting process, and executes the motion detection process (steps S13 to S15). When having determined that there is continuously no motion in the shot image (step S18:YES), the CPU 206 reads out the image undergone the image clarification process from the display-image memory area 253 of the memory 201, and projects this image on the screen 4 (step S27).

Figure 14:
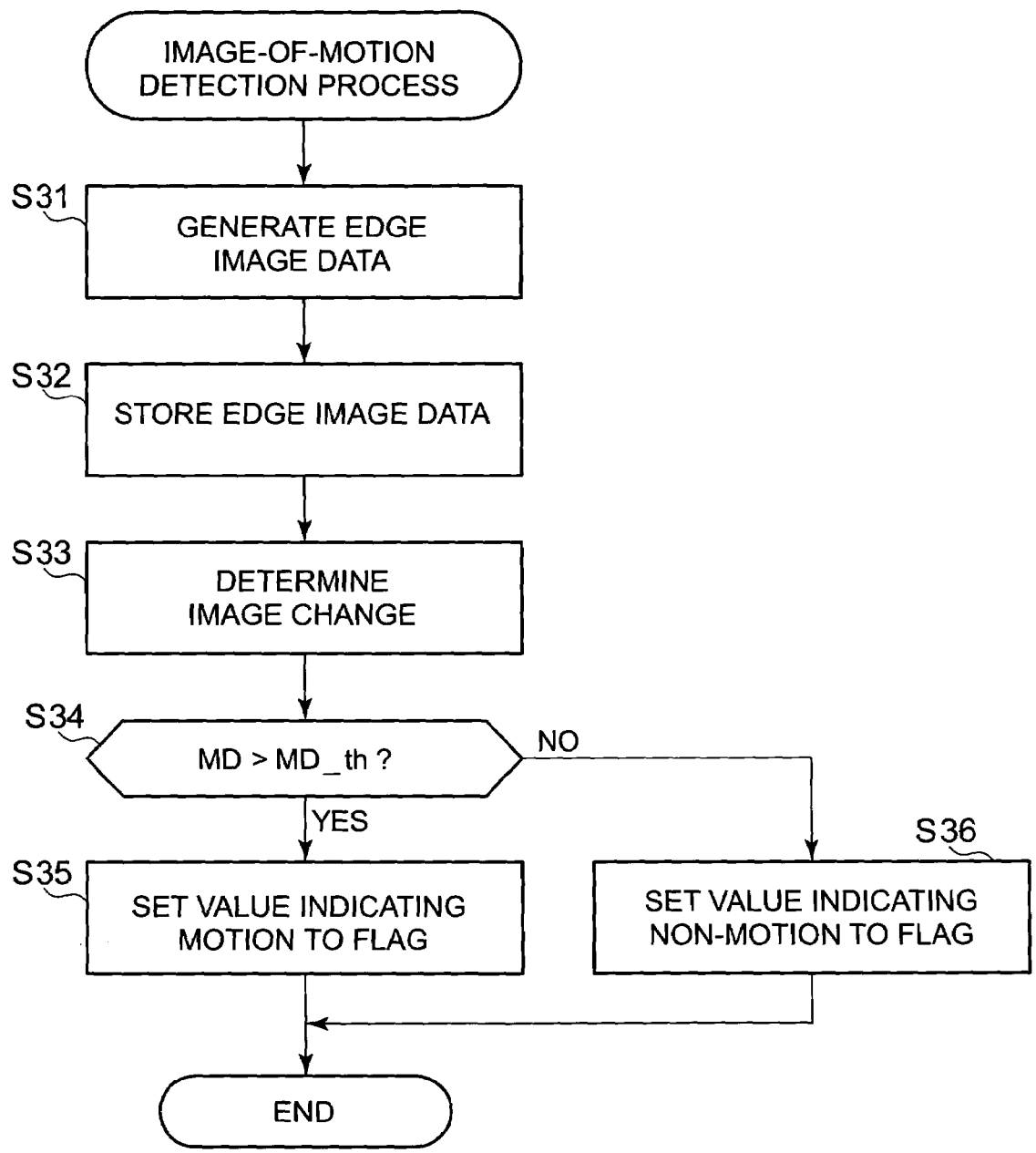
FIG. 14 is a flowchart for explaining an image-motion detection process.

Next, with reference to FIG. 14, an explanation will be given of the image-of-motion detection process to be executed by the image processing device 203 at the step S15.

First, the image processing device 203 generates an edge image as image data to be compared with the next shot image from image data captured by the image sensor 102 (step S31).

The image processing device 203 alternatively stores the generated edge image data in the sensor-image memory areas 251 and 252 (step S32).

For example, when the image sensor 102 acquires image data D1 at a certain time T1, the CPU 206 allows the image sensor 102 to store the image data D1 in the sensor-image memory area 251 (or the sensor-image memory area 252). When the image sensor 102 acquires image data D2 at the next time T2, the CPU 206 allows the image sensor 102 to store the image data D2 in the sensor-image memory area 252 (or the sensor-image memory area 251). Further, when the image sensor 102 acquires image data D3 at the next time T3, the CPU 206 allows the image sensor 102 to store the image data D3 in the sensor-image memory area 251 (or the sensor-image memory area 252) in an overwriting manner.

The image processing device 203 determines the image change MD of the edge image data already stored in the sensor-image memory areas 251 and 252 of the memory 201 and the image data captured by the image sensor 102 with the equation shown in FIG. 28 (step S33).

The image processing device 203 reads out the threshold MD_th from the threshold memory area 256 of the memory 201, and compares the determined image change MD with the read-out threshold MD_th, thereby determining whether or not the object in the shooting range has moved (step S34).

If the image change MD is greater than the threshold MD_th, (step S34: YES), the image processing device 203 determines that the object in the shooting range has moved. In this case, the image processing device 203 sets the value indicating that there has been the motion in the shot image to the motion-detection-result flag of Motion_Result_Flag (step S35). For example, when having determined that there has been a motion in the shot image, the image processing device 203 sets "1" to that flag.

If the image change MD is less than or equal to the threshold MD_th (step S34: NO), the image processing device 203 determines that the object in the shooting range is at rest. In this case, the image processing device 203 sets the value indicating that there is no motion in the shot image to the motion-detection-result flag of Motion_Result_Flag (step S36). For example, when having determined that there is no motion in the shot image, the image processing device 203 sets "0" to that flag.

The image processing device 203 executes the motion detection process in this way.

Figure 15:
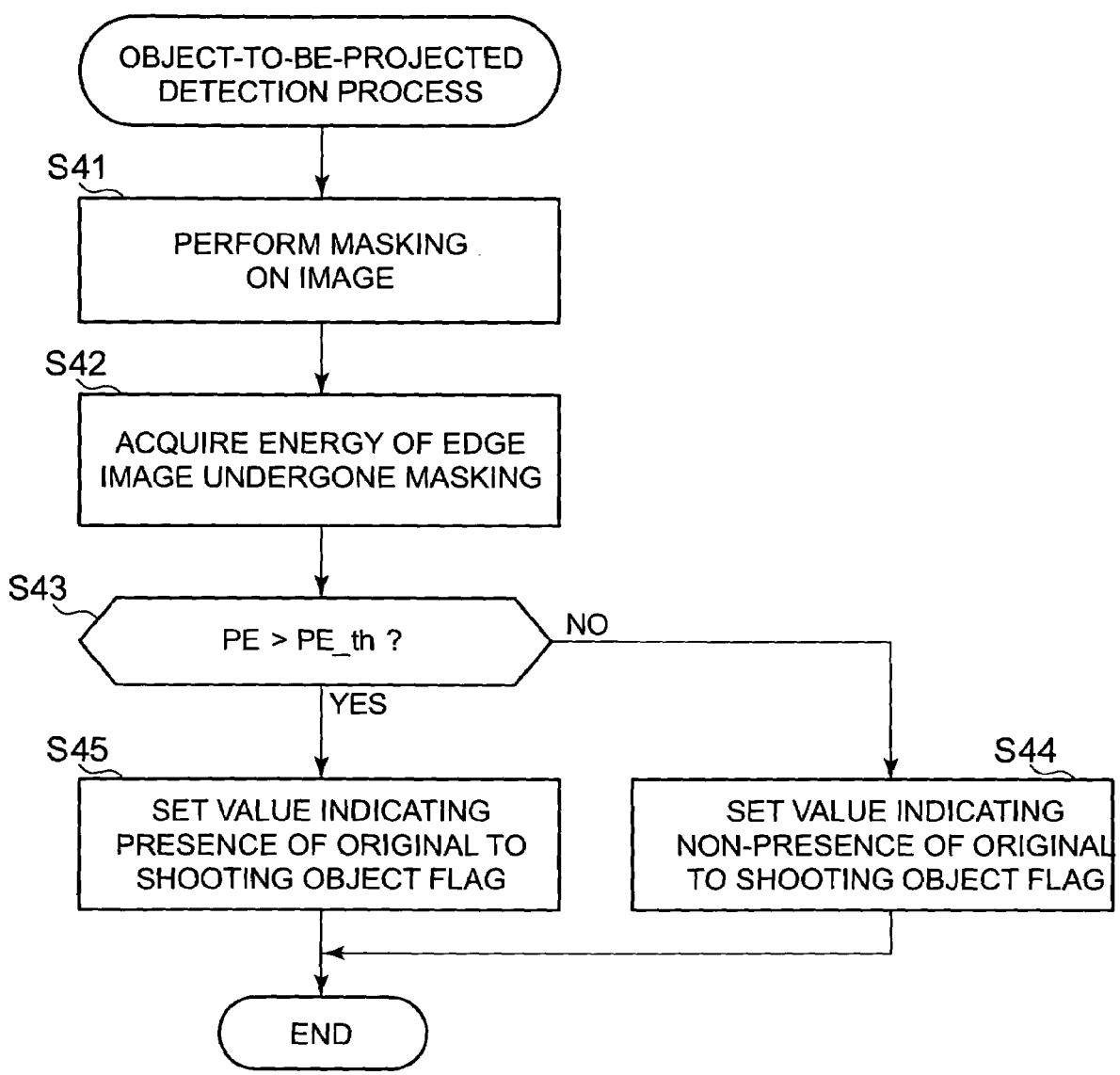
FIG. 15 is a flowchart for explaining the object-to-be-projected detection process.

Next, with reference to the flowchart in FIG. 15, an explanation will be given of the object-to-be-projected detection process to be executed by the image processing device 203 at the step S20.

The object-to-be-projected detection process is for determining whether or not the original 5 to be projected on the screen 4 is placed on the stage 13.

The image processing device 203 takes out the image data acquired by the image data generator 21 form the sensor-image memory areas 251 and 252 of the memory 201, executes the masking on the image data, and obtain the edge image of the stage 13 (step S41).

The image processing device 203 determines the energy PE of the edge image obtained by the masking (step S42). The image processing device 203 stores this image in the process-image memory area 253 of the memory 201.

The image processing device 203 takes out the threshold PE_th from the threshold memory area 256 of the memory 201, and compares the determined PE with the threshold PE_th Based on the comparison result, the image processing device 203 determines whether or not the original 5 to be projected is on the stage 13 (step S43).

If the acquired energy PE is less than or equal to the threshold PE_th (step S43: NO), the image processing device 203 determines that the original 5 is not placed on the stage 13. In this case, the image processing device 203 sets the value indicating that the original 5 is not placed on the stage 13 to the shooting object flag of Object_Flag (step S44). For example, when having determined that the original 5 is not placed on the stage 13, the image processing device 203 sets "0" to that flag.

If the acquired energy PE is greater than the threshold PE_th (step S43: YES), the image processing device 203 sets the value indicating that the original 5 is placed on the stage 13 to the shooting object flag of Object_Flag (step S45). For example, when having determined that the original 5 is placed on the stage 13, the image processing device 203 sets "1" to that flag.

The image processing device 203 executes the object-to-be-projected detection process in this way.

Next, with reference to the flowcharts of FIGS. 16 to 18, an explanation will be given of eth outline acquisition process to be executed by the image processing device 203 at the step S23.

Figure 16:
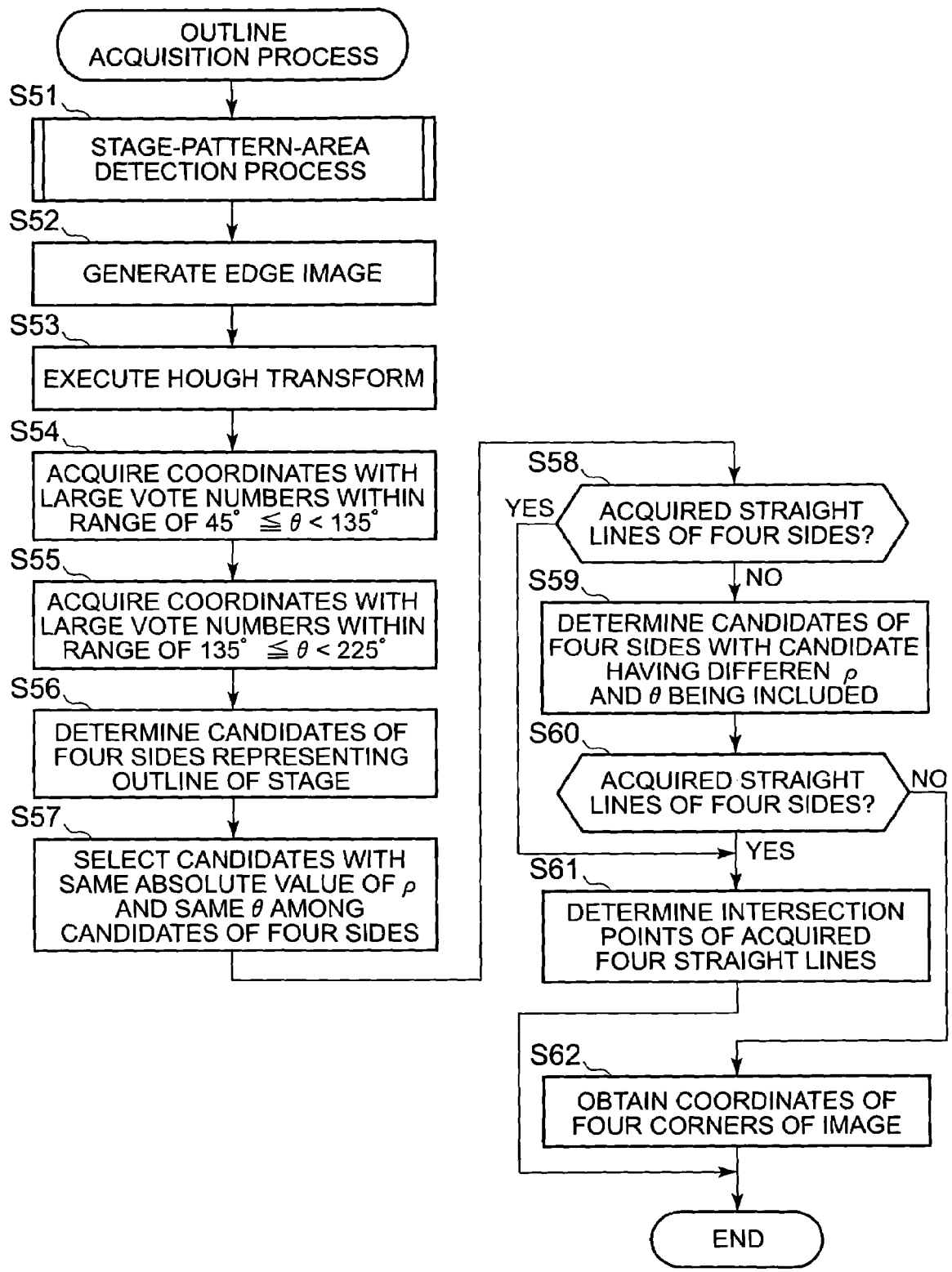
FIG. 16 is a flowchart for explaining an outline acquisition process.

The image processing device 203 executes the process of acquiring the outline of the shot image in accordance with the flow represented by the flowchart illustrated in FIG. 16.

Figure 17:
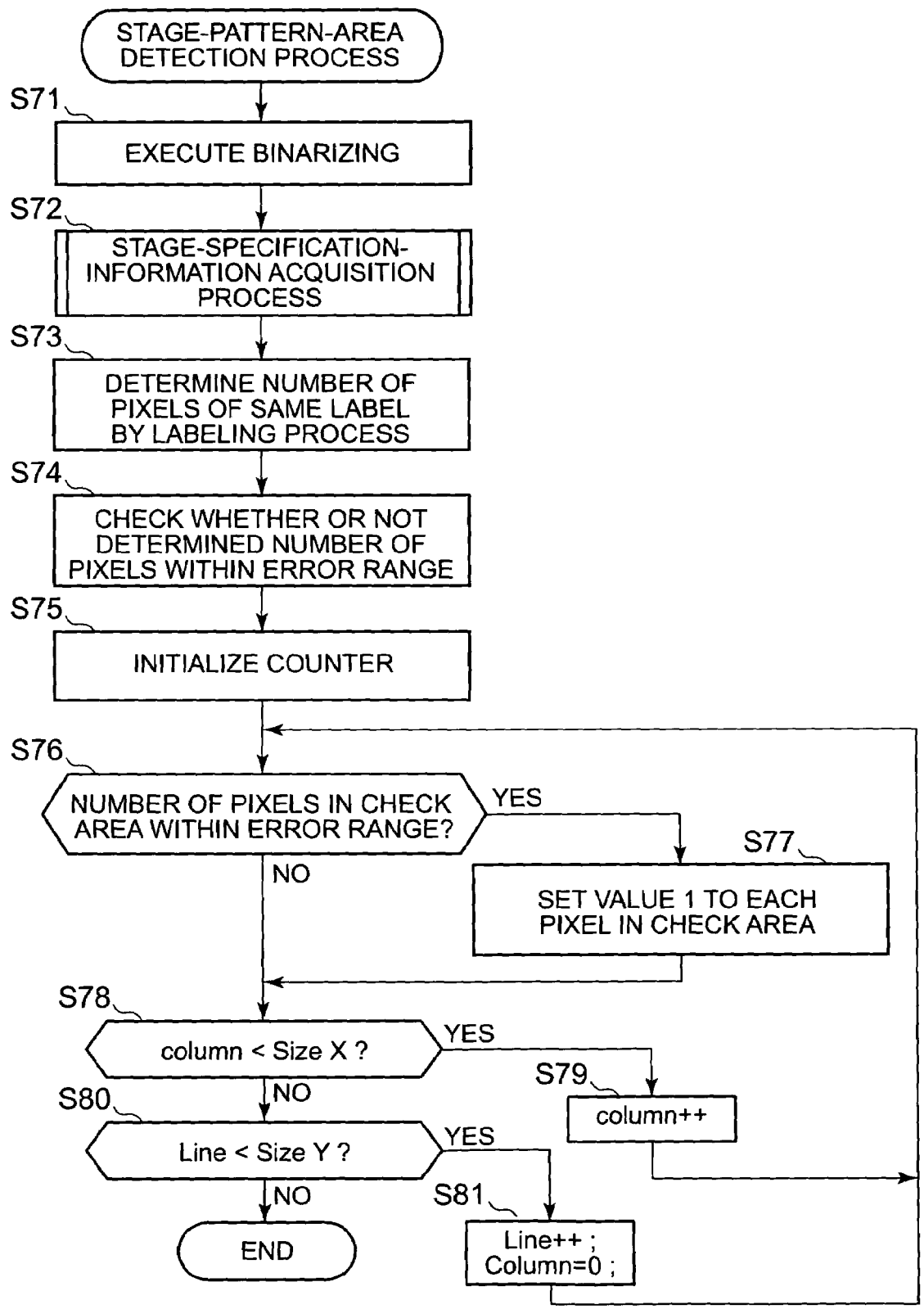
FIG. 17 is a flowchart for explaining a stage-pattern-area detection process.
Figure 18:
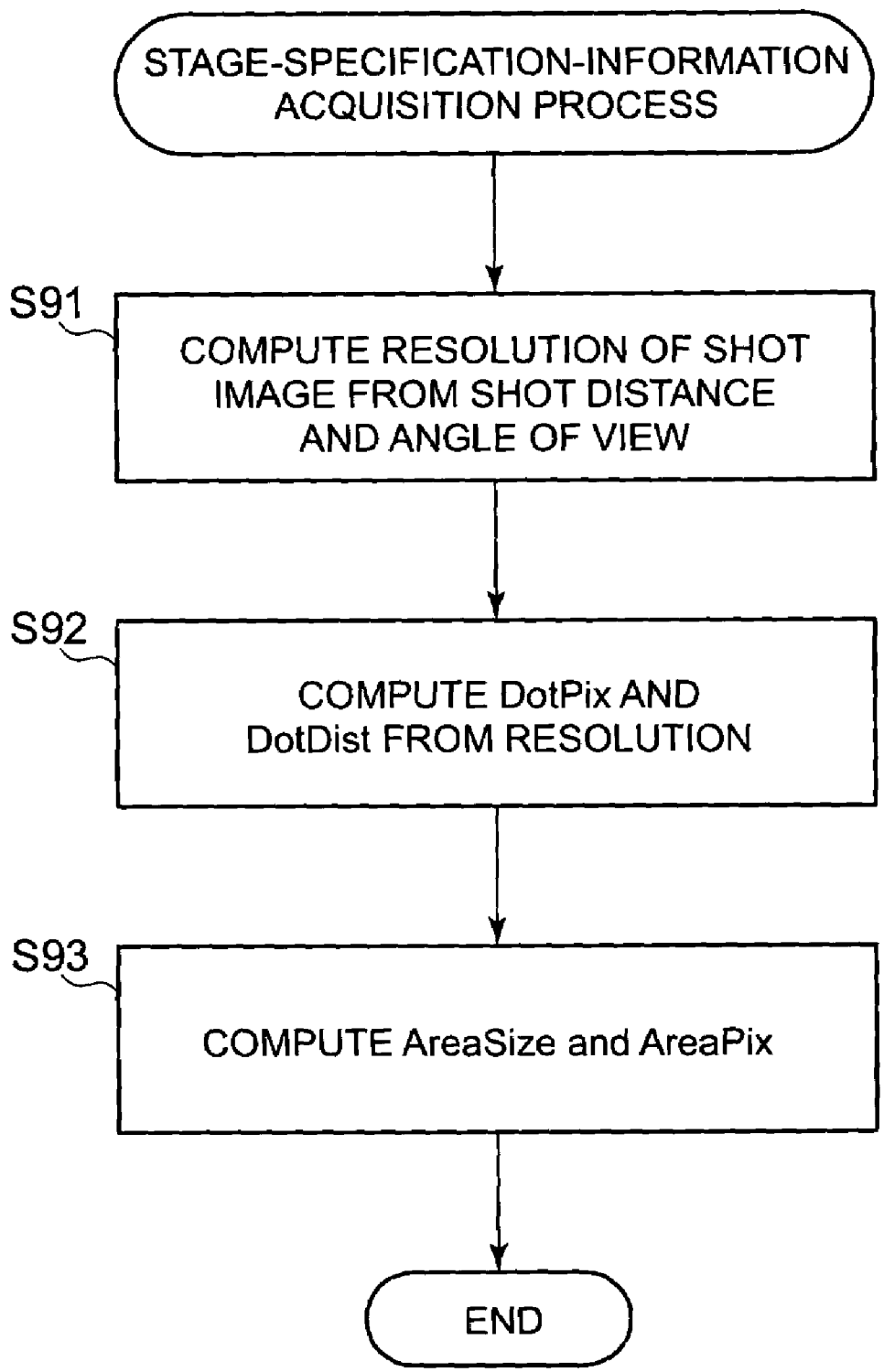
FIG. 18 is a flowchart for explaining a stage-specification-information acquisition process.

The image processing device 203 reads out the shot images from the sensor-image memory areas 251 and 252, and executes the stage-pattern-area detection process such as detecting the stage-pattern area in accordance with the flow represented by the flowchart illustrated in FIG. 17 (step S51).

That is, the image processing device 203 compares each of the pixel values of the shot image obtained by the shooting in the still-picture mode with a preset threshold, and generates the binarized image whose pixel values are expressed by 0 or 1 (step S71).

The image processing device 203 acquires the stage specification information (step S72). The image processing device 203 executes this stage-specification-information acquisition process in accordance with the flow represented by the flowchart illustrated in FIG. 18.

That is, the image processing device 203 computes the resolution (DPI) of the shot image from the shooting distance and the angle of view as the shooting conditions (step S91).

The image processing device 203 computes DotPix (the number of pixels of one dot image) and DotDist (the number of pixels between the central coordinates of the dot images) as the stage specification information from the computed resolution (step S92).

The image processing device 203 computes AreaSize (the number of pixels of a check area A) and AreaPix (the number of pixels of four dot images in the check area A) as the stage specification information with the equations shown in FIG. 29 (step S93).

After acquiring the stage specification information in this way, the image processing device 203 performs the labeling process on the binarized image, and determines the number of linked pixels of the same label (step S73).

The image processing device 203 compares the counted number of pixels NowDotPix with the error range (DotPix±PixError) preset to the number of pixels of the image of one dot 14. If the number of Pixels NowDotPix is greater than the error range (DotPix±PixError), the image processing device 203 determines that the check area 82 is not the image of the dot 14, and writes the value of, for example, "0" in all pixels of the output image 105 which corresponds to the check area 82. In contrast, if the number of pixels NowDotPix is within the error range (DotPix±PixError), the image processing device 203 determines that the check area 82 is the image of the dot 14, and writes the value of, for example, "1" in all pixels of the output image 105 which corresponds to the check area 82 (step S74).

The image processing device 203 initializes the counters of column and line which are used as the coordinates of the check area 82 (step S75).

The image processing device 203 determines whether or not the number of pixels CountNow in the check area 82 which originates at the coordinates (column, line) represented by the counters column and line satisfies the discriminants shown in FIG. 30 (step S76).

When having determined that the discriminants are satisfied (step S76: YES), the image processing device 203 determines that the check area 82 is the area of the image of the stage 13, and sets value "1" in all pixels of the output image 105 which corresponds to the check area 82 (step S77).

In contrast, when having determined that the discriminates are not satisfied (step S76: NO), the image processing device 203 determines that the check area 82 is not the area of the image of the stage 13. The image processing device 203 determines whether or not the counter column is less than or equal to its maximum value SizeX (step S78).

When having determined that the counter of column is less than or equal to SizeX (step S78: YES), the image processing device 203 increments the value of eh counter of column (step S79). The image processing device 203 executes the processes at the step S76 and S77 again.

When having determined that the counter of column reaches into the SizeX (step S78: NO), the image processing device 203 determines whether or not the counter of line is less than or equal to its maximum value SizeY (step S80).

When having determined that the counter of line is less than or equal to SizeY (step S80: YES), the image processing device 203 increments the value of the counter of line and reset the value of the counter of column to "0" (step S81). The image processing device 203 executes the processes at the step S76 to S78 again.

When having determined that the counter line reaches into SizeY (step S80: NO), the image processing device 203 finishes the stage-pattern-area detection process.

Next, the image processing device 203 generates the edge image from the obtained binarized image (step S52 in FIG. 16).

The image processing device 203 executes the Hough transform with the equation shown in FIG. 32B to detect the straight lines (step S53).

The image processing device 203 acquires the plurality of coordinates with large vote numbers as the straight lines forming the up and down sides in the range of 45°≦θ<135°, in accordance with the equations shown in FIG. 32A (step S54).

The image processing device 203 acquires the plurality of coordinates with large vote numbers as the straight lines forming the right and left sides in the range of 135°≦θ<225°, in accordance with the equation shown in FIG. 32B (step S55).

If a plurality of coordinates with large vote numbers are acquired, the image processing device 203 excludes those coordinates other than the one which is the most closest coordinates to the center of the original 5 from the candidates of the four sides which represents the outline of the stage 13 (step S56). The image processing device 203 obtains the candidates of the four sides which represent the outline of the stage 13.

The image processing device 203 searches the coordinates which have different positive and negative values of ρ, and have the angle θ within the setting range, among the obtained candidates, and selects that candidate (step S57).

The image processing device 203 determines whether or not the four straight lines which represent the outline of the stage 13 are acquired (step S58).

When having determined that the four straight lines are acquired (step S58: YES), the image processing device 203 determines the intersection points of the four acquired straight lines (step S61).

In contrast when having determined that the four straight lines are not acquired (step S58: NO), the image processing device 203 performs searching in the similar manner to the step S57 with the straight lines excluded from the candidates being included, and selects the candidates of the respective sides (step S59). The image processing device 203 determines whether or not the four straight lines which represent the outline of the stage 13 are acquired (step S60).

When having determined that the four straight lines are acquired (step S60: YES), the image processing device 203 determines the intersection points of the four acquired straight lines (step S61). That is, the image processing device 203 acquires the four apexes of the stage 13.

When having determined that the four straight lines are not acquired (step S60: NO), the image processing device 203 obtains the coordinates of the four corners of the image (step S62), and finishes the outline acquisition process. In this case, the image processing device 203 obtains the coordinates of the apexes of the binarized image instead of those of the apexes of the quadrangular stage 13.

As explained above, according to the embodiment, the dots 14 are marked on the surface of the stage 13 beforehand, and when the original 5 is placed on that surface, the image processing device 203 acquires the stage specification information based on the resolution of the shot image obtained by shooting. Based on the acquired stage specification information, the image processing device 203 can identify the area of the image of the stage 13, acquire the binarized image with the area of the image of the stage 13 expressed by "1", and determine the boundary between the area of the image of the original 5 and that of the image of the stage 13.

Accordingly, the outline of the image of the original 5 can be accurately acquired regardless of the location of the original 5 placed on the stage 13 even though the original 5 has any size, and the color thereof is not clear.

Second Embodiment

An imaging apparatus of the second embodiment identifies an image of the stage 13 with the surface on which the dots 14 arrange at predetermined angles are laid out.

Figure 19A:
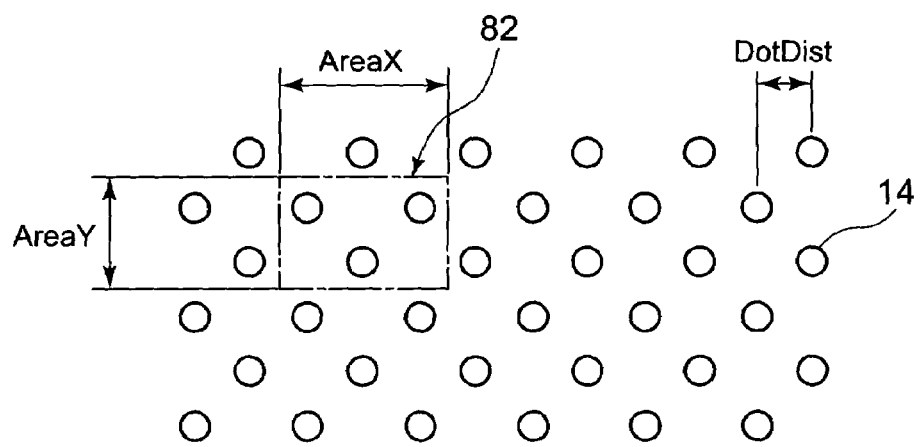
FIG. 19A is an explanatory diagram illustrating a pattern that the dots are laid out in a predetermined direction which is identified by an imaging apparatus according to a second embodiment of the invention.

In the embodiment, it is not necessary that the dots 14 marked on the surface of the stage are laid out at even intervals as illustrated in FIG. 2, and as illustrated in FIG. 19A, the dots 14 may be laid out at predetermined angles and even intervals. For example, in this figure, the dots 14 are laid out at the angles of 45° with respect to the side of the stage 13 at even intervals.

As the document camera 1 shoots the stage 13 and the original 5, the imaging apparatus an image with the pattern as illustrated in FIG. 19A. In this case, the image processing device 203 takes an area which includes the three dots 14 as the check area 82.

The parameter DotDist becomes the number of pixels between the central points of the two dots 14 as illustrated in FIG. 19A. The number of pixels AreaSize and the number of pixels AreaPix are expressed by the equations shown in FIG. 33.

Figure 19B:
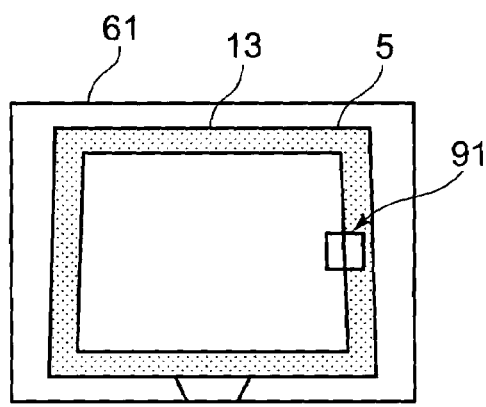
FIGS. 19B and 19C are explanatory diagrams illustrating a shot image of that pattern.
Figure 19C:
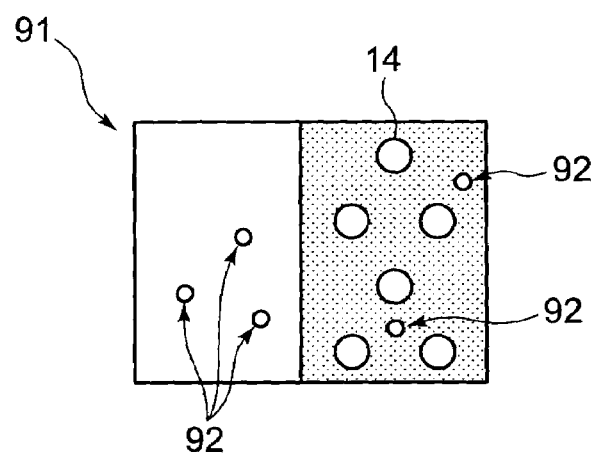

At the above-described acquisition process of the stage specification information, using the equations, the image processing device 203 acquires the numbers of pixels AreaSize and AreaPix as the stage specification information. For example, if the number of pixels DotPix is 17, the number of pixels AreaPix becomes 51 (=17×3) in the embodiment In enlarging an area 91 of the shot image 61 as illustrated in FIG. 19B, the image of the area 91 becomes the image as illustrated in FIG. 19C. The image processing device 203 executes the labeling process as similar to the first embodiment, thereby acquiring an image that only the dots 14 are expressed by "1 (white)" as illustrated in FIG. 20A.

Figure 20A:
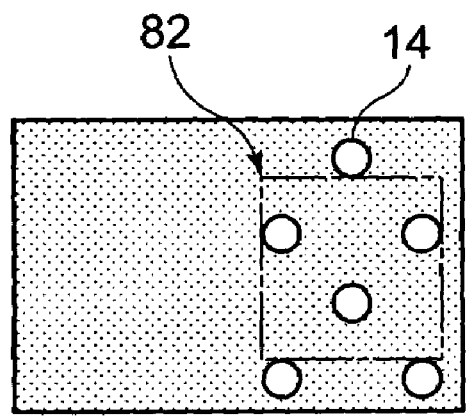
FIGS. 20A to 20C are diagrams for explaining a stage-pattern-area acquisition process of the second embodiment.

As illustrated in FIG. 20A, the image processing device 203 counts the number of pixels with the pixel values of "1" in the set check area 82, and compares the counted number of pixels CountNow with the preset error range (AreaPix±PixError×AreaDot) in a similar fashion to the first embodiment.

Figure 20B:
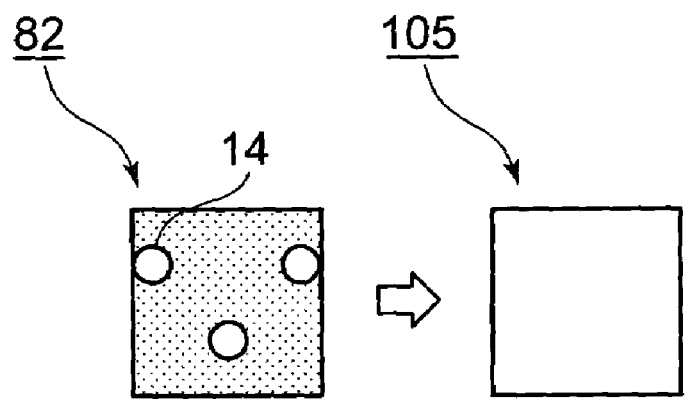

If the discriminants shown in FIG. 30 are satisfied, the image processing device 203 determines that the check area 82 is the area of the image of the stage 13. As illustrated in FIG. 20B, the image processing device 203 writes the pixel values of "1 (white)" in all of the pixels of the output image 105 which corresponds to the check area 82.

Figure 20C:
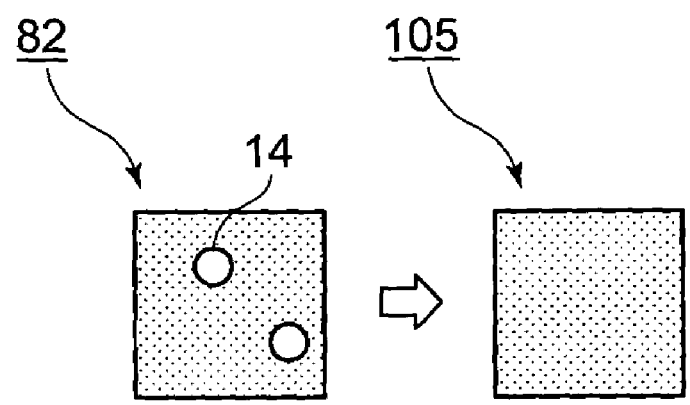

In contrast, if the discriminants are not satisfied, the image processing device 203 determines that the check area 82 is not the area of the image of the stage 13. As illustrated in FIG. 20C, the image processing device 203 writes the pixel values of "0" in all of the output image 105 which corresponds to the check area 82.

In the shot image 61, the image processing device 203 shifts the check area 82 pixel by pixel, and executes the labeling process, and acquires the binarized image 72 as illustrated in FIG. 7B, in a similar fashion to the first embodiment.

As explained above, when the dots 14 are laid out on the surface of the stage 13 at predetermined angles, the image processing device 203 can identify the area of the image of the stage 13.

Third Embodiment

On the stage 13 of an imaging apparatus according to the embodiment, straight lines as reference marks are repeatedly drawn at preset intervals. The imaging apparatus generates a binarized image that the area of the image of the stage 12 is expressed by "1 (white)", and the other area is expressed by "0 (black)".

As illustrated in FIG. 21A, straight lines 211 are repeatedly drawn on the surface of the stage 13. In this case, the image processing device 203 generates the output image 105 with an edge filter 214 illustrated in FIG. 21B, instead of performing the above-described labeling process on the image. The edge filter 214 is so set as to hold an image of the straight line larger than a predetermined length.

The image processing device 203 generates an image including the straight lines 211 illustrated in FIG. 21C with the edge filter 214. The image processing device 203 sets the check area 82 to this image. For example, depending on the location of the check area 82, there may be endpoints 212 of the straight lines 211 in this image.

Based on the resolution at the time of shooting in the still-picture mode, the image processing device 203 sets a quadrangular area with one side, which is defined by the number of pixels square times the number of pixels between the straight lines, as the check area 82.

In the check area 82, the image processing device 203 compares the number of pixels with the pixel values of "1" with the preset error range (AreaPix±PixError×AreaDot).

If the discriminants shown in FIG. 30 are satisfied, the image processing device 203 writes the pixel values of "1 (white)" in all of the pixels of the output image 105 which corresponds to the check area 82 as illustrated in FIG. 21D. In contrast, if the discriminants are not satisfied, the image processing device 203 writes the pixel values of "0" in all of the pixels of the output image 105 which corresponds to the check area 82 as illustrated in FIG. 21E.

In the shot image 61, the image processing device 203 shifts the check area 82 pixel by pixel, executes the labeling process, and acquires the binarized image 72 illustrated in FIG. 7B.

As explained above, according to the embodiment, using the edge filter 214 with the straight-line patter, the image processing device 203 acquires the shot image 61.

When the image of the stage 13 is constituted by the straight-line pattern, the image processing device 203 can identify the straight-line pattern on the surface of the stage 13, and can accurately acquire the outline of the image of the original 5.

Fourth Embodiment

On the stage 13 of an imaging apparatus according to the embodiment, straight lines in the horizontal and vertical directions are repeatedly laid out in such a manner as to intersect with one another at preset intervals. The image processing device 203 generates a binarized image that the area of the image of the stage 13 is expressed by "1 (white)", and the other area is expressed by "0 (black)".

As illustrated in FIG. 22A, horizontal and vertical straight lines 221 and 224 are drawn of the surface of the stage 13. Using image filters 227 and 228 illustrated in FIGS. 22B and 22C, the image processing device 203 generates the output image 105. Both of the filters 227 and 228 illustrated in FIGS. 22B and 22C are set in such a manner as to invert the horizontal and vertical straight lines only and hold images of the horizontal and vertical straight lines only. Width 1, Width 2, Width 3, and Width 4 in FIGS. 22B and 22C represent the widths of the lines.

Based on the resolution of the shot image 61, the image processing device 203 obtains the numbers of pixels corresponding to the widths of the lines, and the numbers of pixels corresponding to the intervals of the lines. The image processing device 203 sets the widths of the image filters 227 and 228 as the numbers of pixels of the widths of the lines included in the image to be projected.

The image processing device 203 executes filtering with the image filters 227 and 228 respectively illustrated in FIG. 22B and FIG. 22C, and generates images each including the horizontal or vertical straight line 221 or 224 as illustrated in FIG. 22D or FIG. 22E. As illustrated in those figures, endpoints 223 of the horizontal straight lines and endpoints 226 of the vertical straight lines are present in the output image 105.

By the method of least square, the image processing device 203 determines an approximate straight line 222 which connects the endpoints 223 of the horizontal straight lines together. The approximate straight line 222 is the boundary between the stage 13 and the original 5, and is the right or left side of the quadrangular original 5. Likewise, by the method of least square, the image processing device 203 determines an approximate line 225 which connects the endpoints 226 of the vertical straight lines together. The approximate straight line 225 is the boundary between the stage 13 and the original 5, and is the up or down side of the quadrangular original 5.

Figure 23:
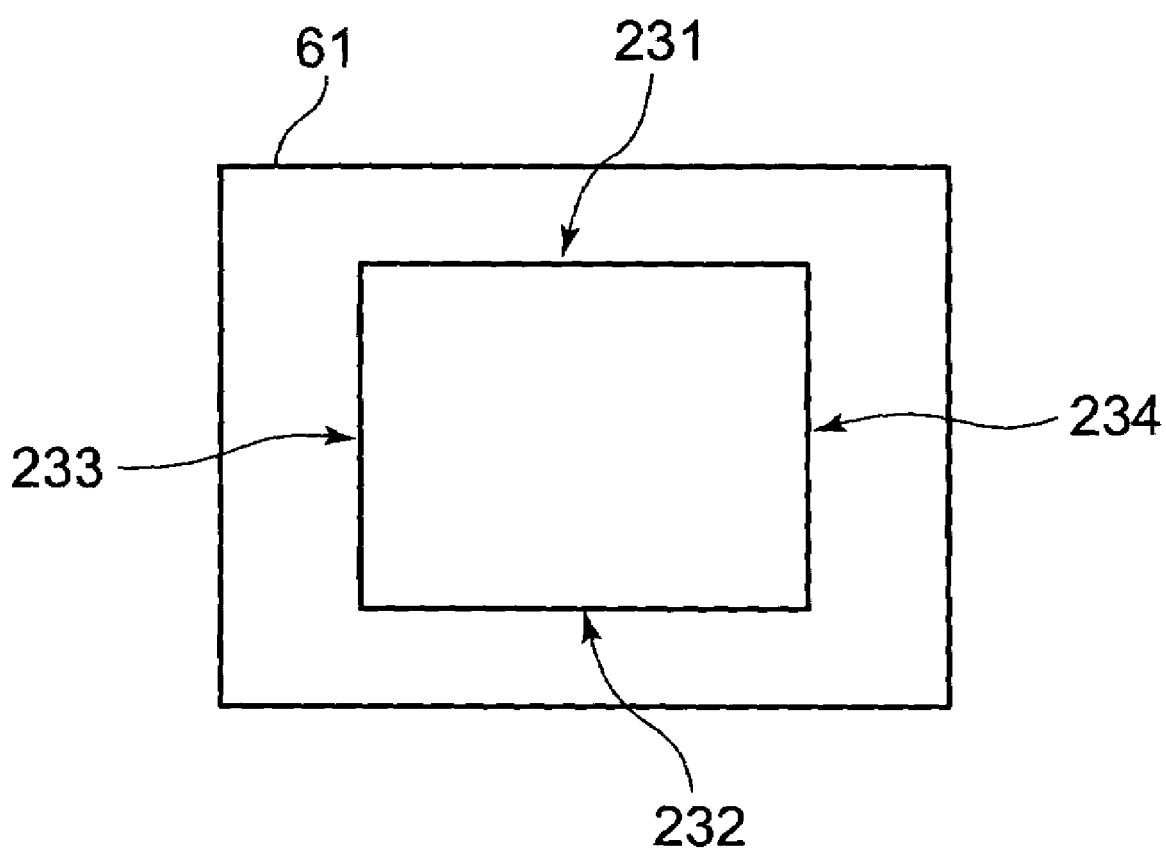
FIG. 23 is an explanatory diagram of four sides contoured by straight lines representing a boundary between an original and a stage.

The image processing device 203 obtains the four sides of a quadrangular such as the original 5 illustrated in FIG. 23.

Next, an explanation will be given of the imaging apparatus of the fourth embodiment.

Figure 24:
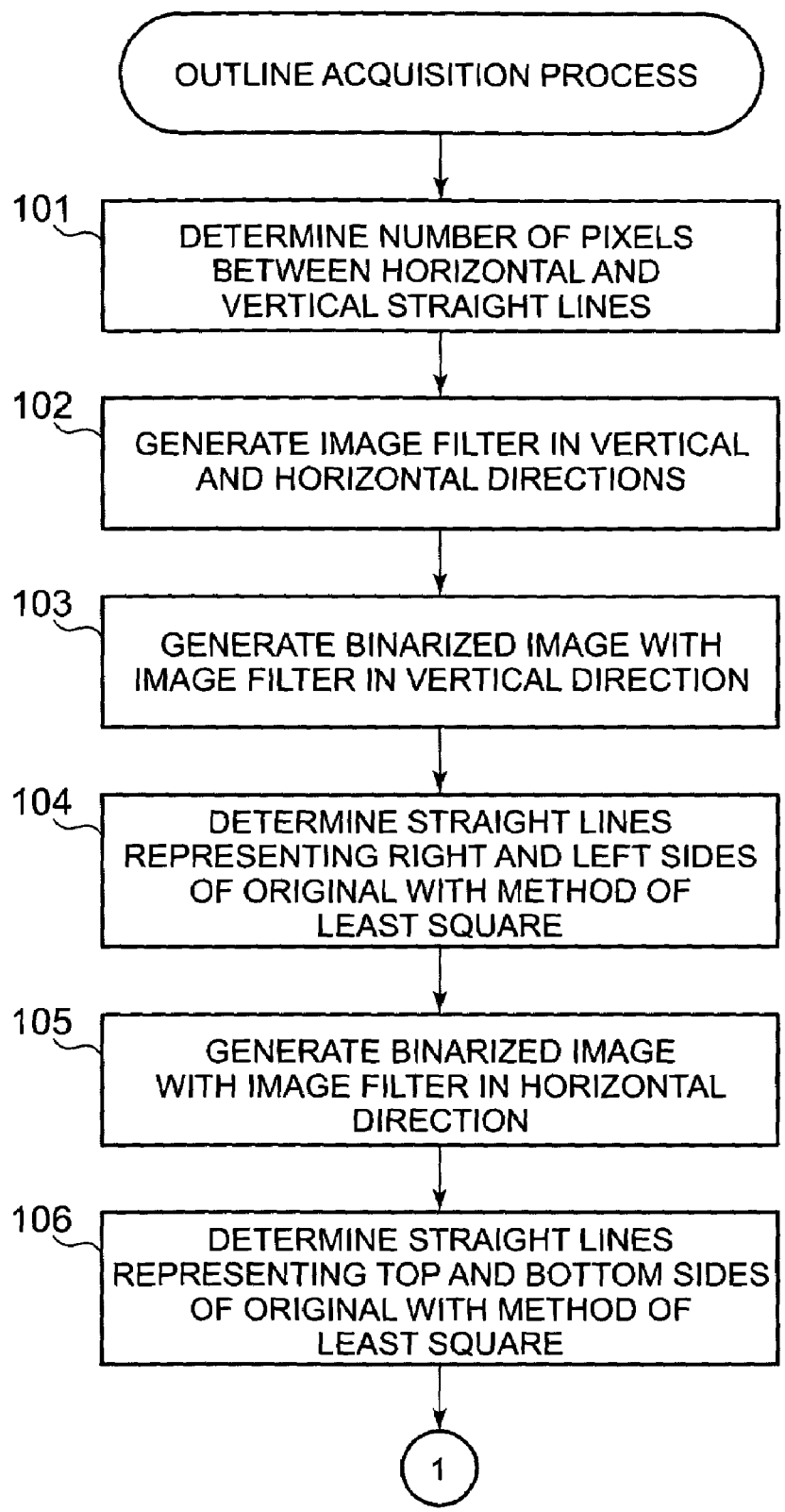
FIG. 24 is a flowchart for explaining an outline acquisition process to be executed by an imaging device according to a fourth embodiment of the invention.
Figure 25:
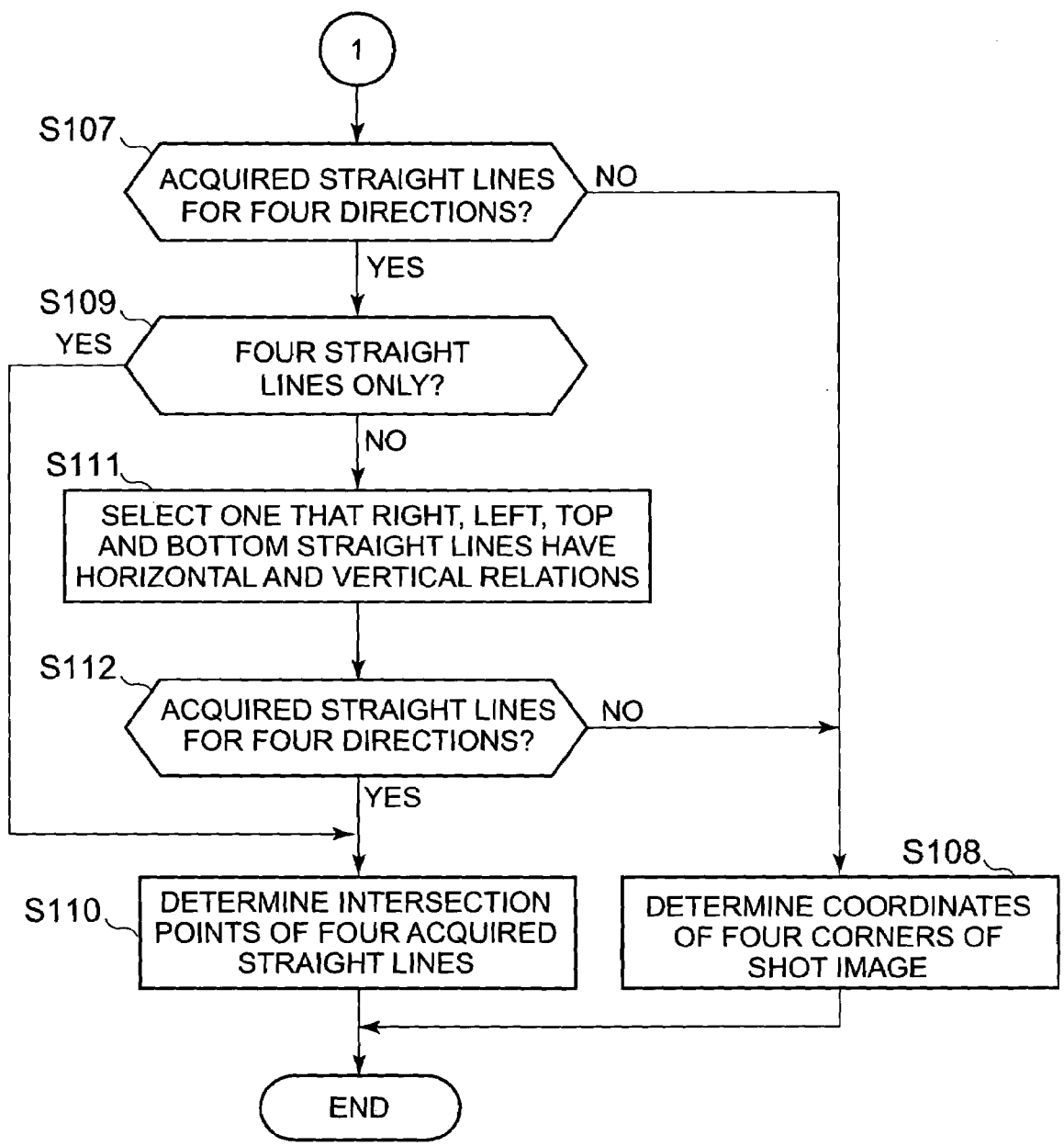
FIG. 25 is a flowchart for explaining the outline acquisition process to be executed by the imaging device of the fourth embodiment of the invention.
Figure 26A:
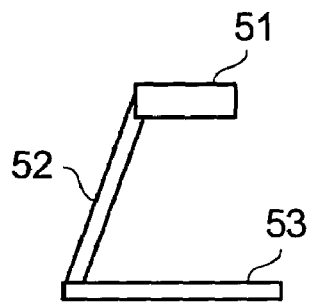
FIGS. 26A and 26B are diagrams illustrating a conventional imaging apparatus.
Figure 26B:
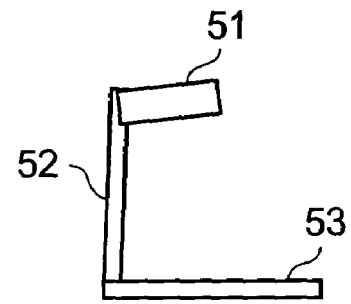
Figure 27A:
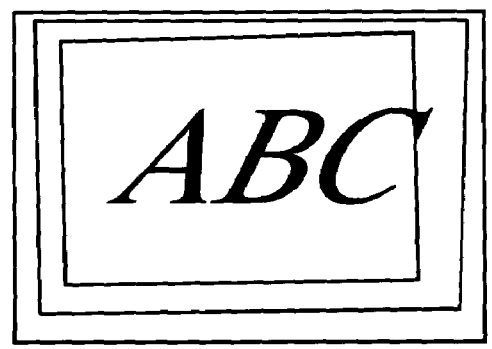
FIGS. 27A and 27B are explanatory diagrams of the function of the conventional imaging apparatus.
Figure 27B:
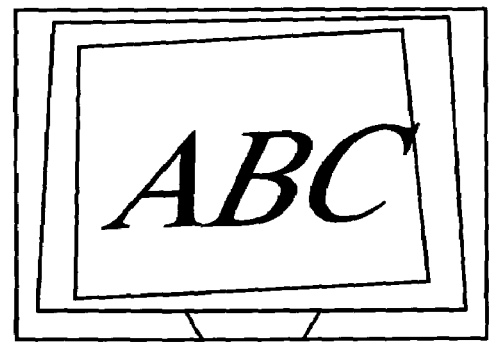

The image processing device 203 executes the outline acquisition process of the shot image 61 in accordance with the flow of the flowchart of FIG. 24.

The image processing device 203 determines the numbers of pixels between the straight lines in the horizontal and vertical directions drawn on the stage 13 from the shooting distance and the zoom value (step S101).

The image processing device 203 reads out the shot images 61 from the sensor-image memory areas 251 and 252 of the memory 201, and generates the vertical and horizontal image filters 227 and 228 illustrated in FIGS. 22B and 22C (step S102).

The image processing device 203 reads out the shot image 61 from the memory 201, and, using the image filter 228 illustrated in FIG. 22C, the image processing device 203 performs filtering on an image which corresponds to the vertical straight lines being present on the surface of the stage 13, thereby generating the binarized image illustrated in FIG. 22E (step S103).

The image processing device 203 traces the straight line 224 of the binarized image, and detects the endpoints in the bottom direction in for the upper side of the image, and detects the endpoints in the upper direction for the bottom side of the image. The image processing device 203 determines the approximate straight line 225 which connects each endpoint in accordance with the method of least square, and takes the approximate straight line 225 as the candidate of the top or bottom side (step S104).

The image processing device 203 reads out the shot image from the memory 201, and, using the generated image filter 225 illustrated in FIG. 22B, the image processing device 203 performs filtering on the image which corresponds to the horizontal straight lines 221 being present on the surface of the stage 13, thereby generating the binarized image illustrated in FIG. 22D (step S105).

The image processing device 203 traces the straight line 221 of the binarized image, and detects the endpoints in the right direction for the left side of the image, and detects the endpoints in the left direction for the right side of the image. The image processing device 203 determines the approximate straight line 222 which connects each endpoint 223 in accordance with the method of least square, and takes the approximate straight line 222 as the candidate of the top or bottom side (step S106).

The image processing device 203 determines whether or not the straight lines for four directions are acquired (step S107).

When having determined that the straight lines in the four directions are not acquired (step S107: NO), the image processing device 203 determines the coordinates which represent the apexes of the shot image 61 (step S108).

When having determined that the straight lines in the four directions are acquired (step S107: YES), the image processing device 203 determines whether or not one straight line is acquired for each direction and the four straight lines in the four direction are acquired in total (step S109).

When having determined that the four straight lines are acquired (step S109:YES), the image processing device 203 determines the intersection points of those straight lines (step S110).

If the number of the detected straight lines is not four (step S109: NO), the image processing device 203 selects the right, left, top and bottom straight lines with horizontal and vertical relations among the straight lines in the directions of X-axis and Y-axis (step S111).

The image processing device 203 determines whether or not the four straight lines which meet such a condition have been acquired (step S112).

When having determined that the four straight lines have been acquired (step S112: YES), the image processing device 203 determines the intersection points of the acquired four straight lines (step S110).

When having determined that the four straight lines have not been acquired (step S112: No), the image processing device 203 determines the coordinates of the apexes of the shot image 61 (step S108).

As explained above, according to the embodiment, the image processing device 203 applies the image filters 227 and 228 illustrated in FIGS. 22B and 22C to the image of the stage 13 on which the horizontal and vertical straight lines are drawn, and generates the output image 105, thereby accurately acquiring the outline of the image of the original 5.

The image processing device 203 acquires the line of the edge of the image of the stage 13 by the method of least square, not by the Hough transform. Accordingly, in comparison with the Hough transform which computes all angles, generation of a ghost image is suppressed, and the correct number of straight-line candidates can be acquired.

There are two kinds of the straight lines such as the horizontal and vertical straight lines are laid out on the surface of the stage in the embodiment, but more than or equal to three kinds of the straight lines for identification may be laid out. In this case, the image processing device 203 may acquires the identification straight lines with image filters corresponding to the plural kinds of the identification straight lines. This will improve the accuracy of the identification of the boundary between the stage 13 and the original 5.

Various embodiments are possible to carry out the invention, which is not limited to the above-described embodiments.

For example, in the above-described embodiments, the pixel values of "0" or "1" are written in all of the pixels of the output image 105 which corresponds to the check area 82. However, the invention is not limited to this, and for example, the pixel values of "0" or "1" may be written in every other pixel of the output image 105 which corresponding to the check area 82.

In the third embodiment, the image processing device 203 generates the binarized image which expresses eth area of the image of the stage 13 by "1 (white)" based on the oblique lines of the image of the stage 13. However, as a shot image contains the end faces of the oblique lines when the original 5 is placed on the stage 13, the image processing device 203 may acquire the boundary between the original 5 and the stage 13 based on the respective endpoints of the oblique lines in similar fashion to the fourth embodiment. In the fourth embodiment, the binarized image which expresses the area of the image of the stage 13 by "1 (white)" can be generated from the image of the horizontal and vertical straight lines only.

The imaging apparatus 1 according to the first to fourth embodiments has the image processing device 203. The imaging apparatus 1, however, may have a computer instead of the image processing device 203. This will allows the camera section 11 to be constituted by a general-purpose digital camera. Conversely, the imaging apparatus 1 does not necessarily have to include the computer.

The foregoing description of the embodiment has been given on the premise that the programs are prestored in the respective memories, etc. However, a program which allows the imaging apparatus to entirely or partially operate, or a program which allows the imaging apparatus to execute the above-described processes, may be stored in a computer-readable recording medium, such as a flexible disk, a CD-ROM (Compact Disc Read-Only Memory), a DVD (Digital Versatile Disk), or a MO (Magneto Optical disk), for distribution, and may be installed on another computer to allow the computer to operate as above-described means, or to execute the above-described steps.

The program may be stored beforehand in a disk device or the like of a server device on the Internet, and superimposed on, for example, a carrier wave and downloaded by a computer.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention This application is based on Japanese Patent Application No. 2004-282588 filed on Sep. 28, 2004 and including specification, claims, drawings and summary. The disclosure of the above Japanese Patent Application is incorporated herein by reference in its entirety.

What is claimed is:

1. An imaging apparatus comprising:
    a reference mark determination section (203) which determines an area in which a reference mark is present, from a shot image obtained by shooting a stage (13) on which the reference marks of known shapes are repeatedly laid out at predetermined intervals, and an original (5) placed on the stage (13);
    a count section (203) which sets a check area (82) to the shot image, and determines the number of pixels of an area in which the reference mark determined by the reference mark determination section (203) is present, in the check area (82);
    an area determination section (203) which compares the number of pixels determined by the count section (203) with a predetermined first numeric range, and determines that the check area (82) is an area occupied by the stage (13) if the number of pixels is within the first numeric range; and
    an acquisition section (203) which determines a boundary between the stage (13) and the original (5) based on a determination result of the area determination section (203), and acquires an area in which the original (5) is present.

2. The imaging apparatus according to claim 1,
    wherein the reference marks comprise dots (14) of known shapes laid out at predetermined intervals, and
    the reference mark determination section (203) detects a set of pixels associated with a predetermined pixel value from the shot image, determines the number of pixels for individual sets of pixels, compares a determined number of pixels with a predetermined second numeric range, and determines that the set of pixels is the dot (14) if the determined number of pixels is within the second numeric range.

3. The imaging apparatus according to claim 1, wherein the acquisition section (203) detects a straight line by applying Hough transform to the shot image, and takes an area surrounded by the obtained straight line as the area in which the original (5) is present.

4. The imaging apparatus according to claim 1,
    wherein the reference marks comprise identification straight lines (211) of known shapes laid out at predetermined intervals, and
    the reference mark determination section (203) detects a straight line longer than a predetermined length from the shot image, determines the number of pixels in which the detected straight line is present in the shot image, compares the determined number of pixels with a predetermined second numeric range, and determines that the detected straight line is the identification straight line (211).

5. The imaging apparatus according to claim 1, wherein the count section (203) acquires a resolution of the shot image, sets a range of the check area (82) based on the acquired resolution, and determines the number of pixels of the area in which the reference mark determined by the reference mark determination section (203) is present in the check area (82).

6. An image processing method for an imaging apparatus comprising:
    a reference mark determination step (203) of determining an area in which a reference mark is present, from a shot image obtained by shooting a stage (13) on which the reference marks of known shapes are repeatedly laid out at predetermined intervals, and an original (5) placed on the stage (13);

a count step (203) of setting a check area (82) to the shot image, and determining the number of pixels of an area in which the reference mark determined by the reference mark determination step (203) is present, in the check area (82);

an area determination step (203) of comparing the number of pixels determined by the count step (203) with a predetermined first numeric range, and determining that the check area (82) is an area occupied by the stage (13) if the number of pixels is within the first numeric range; and an acquisition step (203) of determining a boundary between the stage (13) and the original (5) based on a determination result of the area determination step (203), and acquires an area in which the original (5) is present.

7. A recording medium having recorded a program which allows a computer to execute:

a reference mark determination step (203) of determining an area in which a reference mark is present, from a shot image obtained by shooting a stage (13) on which the reference marks of known shapes are repeatedly laid out at predetermined intervals, and an original (5) placed on the stage (13);

a count step (203) of setting a check area (82) to the shot image, and determining the number of pixels of an area in which the reference mark determined by the reference mark determination step (203) is present, in the check area (82);

an area determination step (203) of comparing the number of pixels determined by the count step (203) with a predetermined first numeric range, and determining that the check area (82) is an area occupied by the stage (13) if the number of pixels is within the fist numeric range; and an acquisition step (203) of determining a boundary between the stage (13) and the original (5) based on a determination result of the area determination step (203), and acquires an area in which the original (5) is present.

* * * * *